United States Patent
Han et al.

(10) Patent No.: US 11,954,710 B2
(45) Date of Patent: Apr. 9, 2024

(54) ITEM DISPLAY METHOD AND APPARATUS, COMPUTER DEVICE, AND STORAGE MEDIUM

(71) Applicant: Tencent Technology (Shenzhen) Company Limited, Shenzhen (CN)

(72) Inventors: Rui Han, Shenzhen (CN); Liyun Wang, Shenzhen (CN); Si Lin Liu, Shenzhen (CN); Ren Jun Zheng, Shenzhen (CN); Tingting Li, Shenzhen (CN); Tao Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/682,930

(22) Filed: Feb. 28, 2022

(65) Prior Publication Data

US 2022/0245681 A1 Aug. 4, 2022

Related U.S. Application Data

(63) Continuation of application No. PCT/CN2020/124954, filed on Oct. 29, 2020.

(30) Foreign Application Priority Data

Jan. 10, 2020 (CN) .......................... 202010027669.5

(51) Int. Cl.
*G06Q 30/00* (2023.01)
*G06F 3/0481* (2022.01)
(Continued)

(52) U.S. Cl.
CPC ....... *G06Q 30/0277* (2013.01); *G06F 3/0481* (2013.01); *G06Q 30/0242* (2013.01)

(58) Field of Classification Search
None
See application file for complete search history.

(56) References Cited

U.S. PATENT DOCUMENTS

| 2004/0142745 | A1* | 7/2004 | Hosaka | ............... G07F 17/3211 463/31 |
| 2007/0076978 | A1* | 4/2007 | Tsubaki | .................. G06T 13/80 382/107 |
| 2007/0104350 | A1* | 5/2007 | Maeno | ............... H04N 1/32203 382/100 |

(Continued)

FOREIGN PATENT DOCUMENTS

| CN | 106681591 A | 5/2017 |
| CN | 107179859 A | 9/2017 |

(Continued)

OTHER PUBLICATIONS

Lincoln; Display Scientific Graphis on Computer; IEEE pp. 138-151; Jun. 1997.*

(Continued)

*Primary Examiner* — Radu Andrei
(74) *Attorney, Agent, or Firm* — Crowell & Moring LLP

(57) ABSTRACT

A media recommendation for a target item is provided while media information is displayed through an information display interface that includes detailed information of the target item when a display position of the media information meets a preset condition. A dynamic effect is displayed that the target item moves from the media information to a preset position in the detailed information while displaying the detailed information. The dynamic display of the target item enriches display of the target item to attract users' attention and focus, thereby improving the recommendation effect of the target item.

20 Claims, 11 Drawing Sheets

(51) Int. Cl.
*G06Q 30/0241* (2023.01)
*G06Q 30/0242* (2023.01)

(56) References Cited

U.S. PATENT DOCUMENTS

| | | | | |
|---|---|---|---|---|
| 2007/0171192 | A1* | 7/2007 | Seo | H04M 1/72427 345/531 |
| 2013/0283655 | A1* | 10/2013 | Saito | H04N 21/41422 40/370 |
| 2014/0280180 | A1 | 9/2014 | Edecker et al. | |
| 2014/0317511 | A1* | 10/2014 | Bailiang | G09B 29/106 715/730 |
| 2017/0243564 | A1* | 8/2017 | Kim | G06T 13/80 |
| 2018/0322663 | A1* | 11/2018 | Zhang | G06T 13/80 |
| 2021/0133355 | A1* | 5/2021 | Verma | G06F 21/6254 |

FOREIGN PATENT DOCUMENTS

| | | |
|---|---|---|
| CN | 107622188 A | 1/2018 |
| CN | 107957775 A | 4/2018 |
| CN | 111242682 A | 6/2020 |

OTHER PUBLICATIONS

Onishi; Auto-assisting figure presentation system for inclusion education; IEE; pp. 176-181; 2016.*
Yang; Displaying Method of Remote Sensing Images; IEEE; pp. 344-349; 2019.*
International Search Report and Written Opinion received for Application No. PCT/CN2020/124954 dated Jan. 28, 2021 (English and Chinese languages) (10 pages).

* cited by examiner

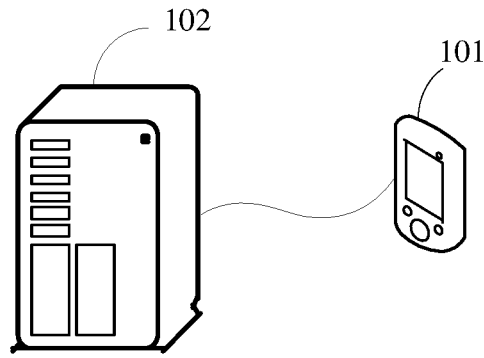

FIG. 1

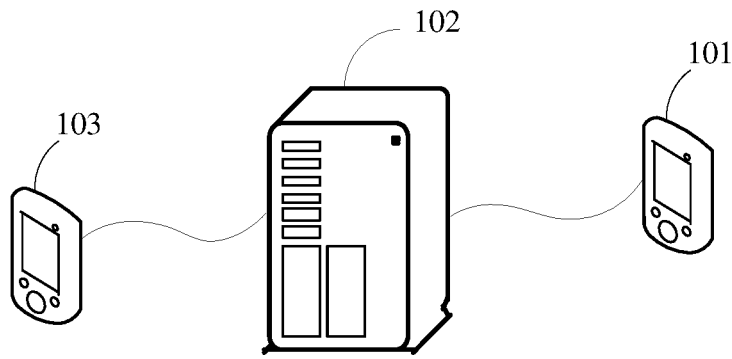

FIG. 2

| A terminal displays media information through an information display interface, the media information including at least one picture, the at least one picture in the media information including a target item | 301 |

| The terminal displays detailed information of the target item through the information display interface in a case that a display position of the media information is located in a preset focus area of the information display interface | 302 |

| The terminal displays a dynamic effect that the target item moves from the media information to a preset position in the detailed information while displaying the detailed information | 303 |

FIG. 3

ITEM DISPLAY METHOD AND APPARATUS, COMPUTER DEVICE, AND STORAGE MEDIUM

RELATED APPLICATION

This application claims priority as a continuation of PCT/CN2020/124954, filed on Oct. 29, 2020, and entitled "ITEM DISPLAY METHOD AND APPARATUS, COMPUTER DEVICE, AND STORAGE MEDIUM", which claims priority to Chinese Patent Application No. 202010027669.5, entitled "ITEM DISPLAY METHOD" filed on Jan. 10, 2020, each of which are incorporated herein by reference in their entirety.

FIELD OF THE TECHNOLOGY

Embodiments of this application relate to the field of computer technologies, and in particular, to an item display method and apparatus, a computer device, and a storage medium.

BACKGROUND OF THE DISCLOSURE

As Internet technologies are widely used and the scale of the Internet gradually increases, advertisers generally publish advertisements for items in the form of media information, and users may deepen understanding of the items when browsing the media information, to recommend the items to the users.

In the related technology, the advertisers may autonomously upload media information. The media information may include a text, a picture, and the like related to items, and may further include item links. However, the media information is generally displayed in a static manner. This display manner may be excessively rigid, and as a result, the media information may be easily ignored by the users, which can result in a poor recommendation.

SUMMARY

Embodiments of this application provide an item display method and apparatus, a computer device, and a storage medium, to improve a recommendation efficiency of an item. The technical solutions are described in the following example embodiments.

According to one embodiment, an item display method is provided, including: displaying media information through an information display interface, the media information including at least one picture, the at least one picture in the media information including a target item; displaying detailed information of the target item through the information display interface when a display position of the media information meets a preset condition; and displaying a dynamic effect that the target item moves from the media information to a preset position in the detailed information while displaying the detailed information.

According to another embodiment, an item display apparatus is provided, including: a first display module, configured to display media information through an information display interface, the media information including at least one picture, the at least one picture in the media information including a target item; a second display module, configured to display detailed information of the target item through the information display interface when a display position of the media information meets a preset condition; and a third display module, configured to display a dynamic effect that the target item moves from the media information to a preset position in the detailed information while displaying the detailed information.

According to another embodiment, an item display method is provided, including: displaying media information and detailed information of a target item through an information display interface, the media information including at least one picture, the at least one picture in the media information including the target item, and the media information and the detailed information being located on different cards; and displaying, through the information display interface when a display position of the media information meets a preset condition, a dynamic effect that the target item moves from the media information to a card in which the detailed information is located.

According to another embodiment, an item display apparatus is provided, including: a first display module, configured to display media information and detailed information of a target item through an information display interface, the media information including at least one picture, the at least one picture in the media information including the target item, and the media information and the detailed information being located on different cards; and a second display module, configured to display, through the information display interface when a display position of the media information meets a preset condition, a dynamic effect that the target item moves from the media information to a card in which the detailed information is located.

According to another embodiment, an item display method is provided, including: displaying media information through an information display interface, the media information including at least one picture, the at least one picture in the media information including a target item; and displaying, in response to receiving a user browsing operation, a dynamic effect that a picture including the target item in the media information moves to a preset position in detailed information while displaying the detailed information of the target item.

According to another embodiment, an item display apparatus is provided, including: a first display module, configured to display media information through an information display interface, the media information including at least one picture, the at least one picture in the media information including a target item; and a second display module, configured to display, in response to receiving a user browsing operation, a dynamic effect that a picture including the target item in the media information moves to a preset position in detailed information while displaying the detailed information of the target item.

According to another embodiment, a computer device is provided, including a processor and a memory, the memory storing at least one piece of program code, the at least one piece of program code being loaded and executed by the processor to implement operations performed in the item display method.

According to another embodiment, a computer-readable storage medium is provided, storing at least one piece of program code, the at least one piece of program code being loaded and executed by a processor to implement operations performed in the item display method.

According to the method, the apparatus, the computer device, and the storage medium provided in some embodiments of this application, media information is displayed through an information display interface, detailed information of a target item is displayed through the information display interface when a display position of the media information meets a preset condition, and a dynamic effect that the target item moves from the media information to a preset position in the detailed information is displayed while the detailed information is displayed, thereby implementing the dynamic display of the target item, and enriching a display manner of the target item. This can attract users' attention, and obtain user' focus, thereby improving the recommendation effect of the target item.

In addition, in a presentation scenario of reading fragmentation like an information flow, when a plurality of pieces of media information are displayed for users to view, users' attention can be effectively attracted in a manner of dynamically displaying the target item.

In addition, by setting a preset focus area, the detailed information of the target item is displayed through the information display interface when the display position of the media information is located in the preset focus area of the information display interface, while a dynamic effect of the target item is displayed, to prevent item information from being displayed when the position of the media information in the information display interface does not attract the users' attention, causing that the users ignores the item information, thereby enhancing the display of the item information, and improving the recommendation effect of the target item.

In addition, a dynamic effect that the detailed information gradually moves in a specified direction from the display position of the media information, and the detailed information is gradually displayed during movement is displayed through the information display interface, thereby enriching a page display effect, further attracting the users' attention, and improving the recommendation effect of the target item.

In addition, by obtaining a movement path and a rotation angle of the target item, a dynamic effect that the target item moves according to the movement path and rotates according to the rotation angle is displayed while the detailed information is displayed, thereby clarifying a specific display form of the dynamic effect.

In addition, by using a tween animation technology, picture frames are automatically filled, to play a tween animation, thereby completely displaying the dynamic effect that the target item moves from the media information to the preset position in the detailed information, and perfecting details in this solution.

In addition, a position of a second item picture in a second interface picture layer on the information display interface is changed while the detailed information is displayed in a first interface picture layer, thereby achieving the dynamic effect of displaying that the target item moves from the media information to the preset position in the detailed information.

In addition, the second item picture is fused with a first item picture, so that the second item picture covers a target item in the first item picture, and the second item picture is set to a transparent state, for making a basic preparation for subsequently displaying the movement of the target item. Subsequently, the second item picture may be set to an opaque state, to show an effect that the target item is gradually displayed.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show only some embodiments of this application, and a person of ordinary skill in the art may still derive other accompanying drawings from the accompanying drawings without creative efforts.

FIG. 1 is a schematic diagram of an implementation environment according to one embodiment.

FIG. 2 is a schematic diagram of another implementation environment according to one embodiment.

FIG. 3 is a flowchart of an item display method according to one embodiment.

DESCRIPTION OF EMBODIMENTS

Figure 4:
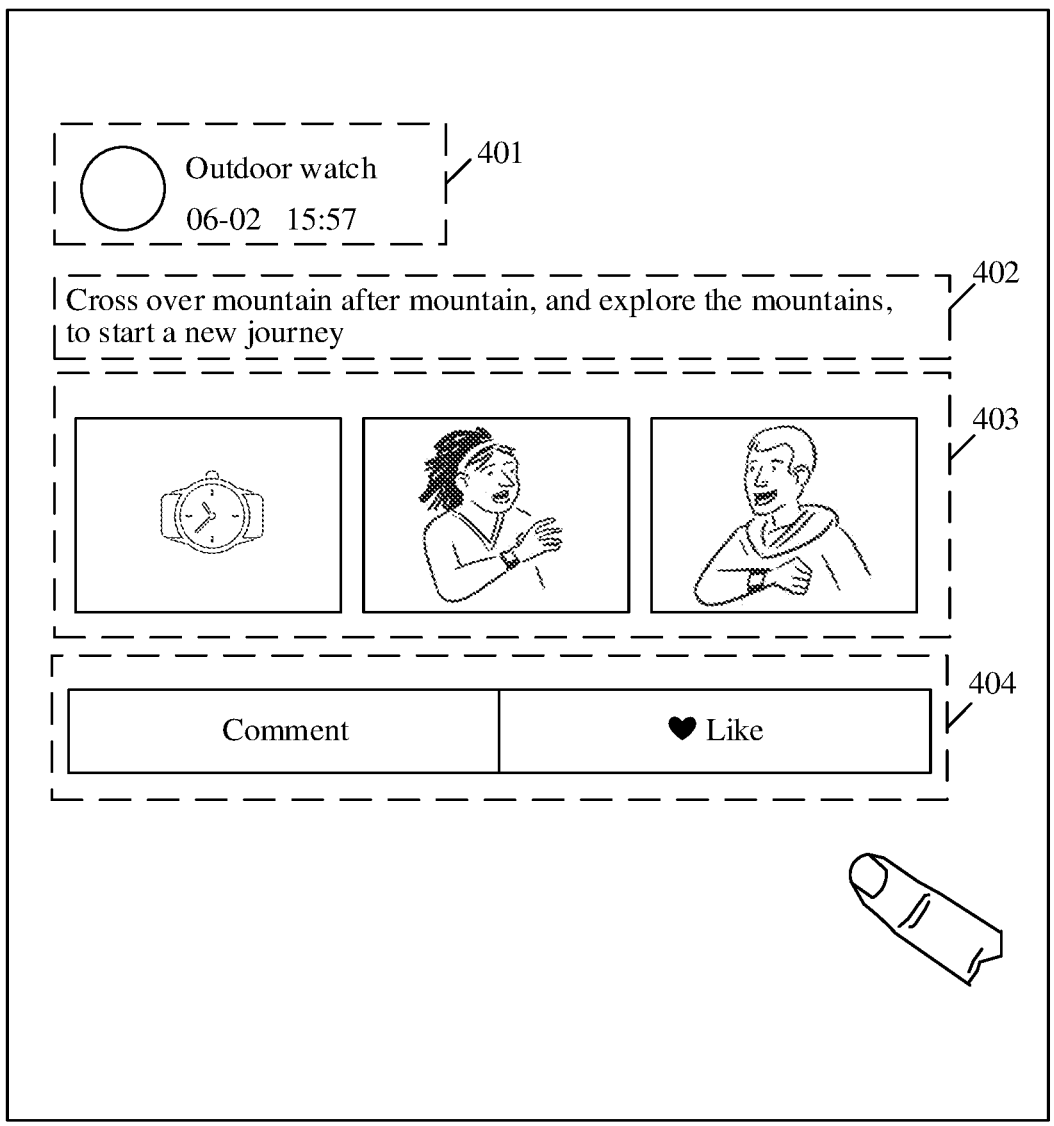
FIG. 4 is a schematic diagram of an information display interface according to one embodiment.

To make objectives, technical solutions, and advantages of the embodiments of this application clearer, implementations of this application are further described below in detail with reference to the accompanying drawings.

Some embodiments provide an item display method, in which media information including a target item may be displayed in an information display interface, and detailed information of the target item is displayed through the information display interface when a display position of the media information meets or satisfies a preset condition, while a dynamic effect that the target item moves from the media information to a preset position in the detailed information is displayed, thereby implementing the dynamic display of the target item. Compared with a manner of static display, the manner of dynamic display is more vivid and flexible, and users' attention is easily attracted, thereby improving the recommendation effect of the target item.

An execution body of one embodiment is a computer device. In some embodiments, the computer device is a terminal, or includes a terminal and a server. FIG. 1 is a schematic diagram of an implementation environment according to one embodiment. Referring to FIG. 1, the implementation environment includes: a terminal 101 and a server 102. The terminal 101 is connected to the server 102. In some embodiments, the terminal 101 is a mobile phone, a computer, a tablet computer, or the like. The server 102 is a server, a server cluster formed by several servers, or a cloud computing service center. The server 102 may send media information to the terminal 101, and the terminal 101 displays the media information for users to view the media information. In addition, when displaying the media information, the terminal 101 may further dynamically display a target item, to attract users' attention. For example, manners of dynamic display include: displaying a dynamic effect that the target item moves from the media information to a preset position in detailed information while displaying the detailed information of the target item included in the media information; or displaying, when the media information and detailed information are displayed on different cards, a dynamic effect that the target item moves from the media information to a card in which the detailed information is located; or displaying a dynamic effect that a picture including the target item moves from the media information to a preset position in detailed information while displaying the detailed information. The terminal 101 logs in to the server 102 based on a user identifier. The user identifier is used for determining an identity of a user of the terminal 101, and may be a user name, a user nickname, a user account, or the like. In some embodiments, the media information is media information automatically recommended by the server 102 to the user identifier, or is media information published by a friend user identifier of the user identifier on the server 102, or is media information published by any user identifier that logs in to the server 102 on the server 102. In a possible implementation, referring to FIG. 2, the implementation environment further includes a terminal 103. The terminal 103 obtains to-be-published media information, and sends the to-be-published media information to the server 102, the server 102 publishes the media information, that is, sends the media information to the terminal 101 that logs in to the server 102, and the terminal 101 may display the media information.

The method provided in some embodiments is applicable to any scenario of recommending an item. For example, in a scenario of releasing a commodity advertisement: An advertiser uploads a commodity picture and a commodity link to a server, and the server divides a background from a commodity in the commodity picture, to obtain a background presentation picture that does not include the commodity and a commodity presentation picture that includes only the commodity, uses the background presentation picture, the commodity presentation picture, and the commodity link as commodity information, and stores the commodity information in an advertisement library; or the server uses the commodity picture, the background presentation picture, the commodity presentation picture, and the commodity link as commodity information, and stores the commodity information in an advertisement library. Later, when a user publishes media information on the server, and a plurality of pictures in the media information include the foregoing commodity, the terminal displays detailed information of the commodity when displaying the media information, where the detailed information includes the background presentation picture and the commodity link, does not include the commodity picture, and either does not include the commodity presentation picture; displays a dynamic effect that the commodity picture moves from the media information to the background presentation picture while displaying the detailed information of the commodity; and finally fuses the commodity presentation picture with the background presentation picture into a commodity picture.

FIG. 3 is a flowchart of an item display method according to one embodiment. An execution body of some embodiments is a terminal. Referring to FIG. 3, the method includes the following steps:

301. A terminal displays media information through an information display interface, the media information including at least one picture, the at least one picture in the media information including a target item.

In some embodiments, the information display interface is an interface used for displaying information in the terminal, and is an interface used for displaying a user identifier and media information published by a friend user identifier of the user identifier, or the information display interface is an information display interface provided by the server, and is used for displaying media information published by each user identifier that logs in to the server.

In some embodiments, the information display interface is a web page or a display interface in an application. For example, the application is an instant messaging application, an information sharing application, a Weibo application, or another application. Alternatively, the information display interface is also another type of display interface. The information display interface includes a media information display area. In some embodiments, the media information display area is located at a top area, a bottom area, a middle area, or any position of the information display interface. The media information display area is used for displaying one or more pieces of media information. In some embodiments, the media information includes a text, a picture, a video, and an item link. In some embodiments, the media information also includes publisher information. The publisher information includes a publisher avatar, a publisher identifier, and a publishing time. The publisher identifier is a user identifier that publishes the media information, such as a user account or a user nickname, and the publisher identifier is a personal user identifier or a public user identifier belonging to an organization, such as a public account of an advertiser.

In some embodiments, the media information is displayed in the information display interface in the form of a card, where the card refers to a display area used for displaying information in the information display interface, a shape of the card may be a box such as a rectangle or a square, and the information included in the card is displayed in the box. The information included in the card may include a text, a picture, a video, and other types, and the card further has display styles, including a text color, a background color, an icon style, a border style, and the like. Display styles of different cards may be the same or different.

An example in which one piece of media information is displayed is used in some embodiments. In some embodiments, the terminal obtains an information flow, and the information flow includes a plurality of pieces of media information. When the plurality of pieces of media information are displayed, a processing of each piece of media information may be similar to this process as described with respect to other embodiments. The media information includes at least one picture, and the at least one picture in the media information includes a target item. When the media information is displayed, the user views the at least one picture, to view the target item. The target items are various types of items such as a watch, clothes, an accessory, and cosmetics. This is not limited to this particular embodiment and may apply to other embodiments. For example, the information display interface is shown in FIG. 4. Media information includes publisher information 401, a text 402, and a picture 403. The publisher information 401 includes a publisher avatar, a publisher identifier "Outdoor watch", and a publishing time "06-02 15:57". In addition, an operation area 404 is displayed below the media information, and the operation area 404 includes operation options for the media information for the user to trigger, such as a comment option and a like option. The user triggers the comment option to comment on the media information, and triggers the like option to perform a like operation or perform a like cancel operation on the media information.

302. The terminal displays detailed information of the target item through the information display interface when a display position of the media information is located in a preset focus area of the information display interface.

When the user views the media information in the information display interface, the user performs a sliding operation on the information display interface. If the terminal detects the sliding operation in the information display interface, and moves the media information according to a sliding direction of the sliding operation, a display position of the media information in the information display interface changes with the sliding operation. In addition, to improve the effect of recommending the target item, detailed information of the target item is correspondingly displayed when the media information is displayed, for the user to view. Therefore, the terminal presets a preset condition that the display position of the media information meets, and obtains item information of one or more items. The item information at least includes detailed information, and may further include other item information.

During the display of the information display interface, the display position of the media information is obtained, and when the display position meets or satisfies the preset condition, it indicates that the user is viewing the media information, and the detailed information of the target item is displayed. When the display position does not meet the preset condition, it indicates that the user may be viewing other media information instead of the media information. In this case, the detailed information of the target item is not displayed first.

1. About the Preset Condition:

In some embodiments, the preset condition includes: the display position of the media information is located in a preset focus area of the information display interface. The preset condition may be met or satisfied differently in different embodiments. Examples are described below.

The terminal presets the preset focus area in the information display interface, and the preset focus area is an area in which sight lines are aligned when the user views the information display interface, that is, an area to which the user is more likely to pay attention. The terminal obtains the display position of the media information, and when the display position is located in the preset focus area, it indicates that the user is viewing the media information, and the detailed information of the target item is displayed. When the display position is not located in the preset focus area, it indicates that the user may be viewing other media information instead of the media information. In this case, the detailed information of the target item is not displayed first.

The preset focus area has a predetermined size and shape, and is a middle area of the information display interface, such as an area whose distance from a top of the information display interface is greater than a first preset distance and is less than a second preset distance, or an area whose distance from a bottom of the information display interface is greater than a third preset distance and is less than a fourth preset distance. Alternatively, the preset focus area is an area whose central axis coincides with a central axis of the information display interface, a width of the preset focus area is equal to a width of the information display interface, and a height is a preset height. In this case, the display position of the media information may be determined according to a central axis of the media information. Correspondingly, whether the display position of the media information is located in the preset focus area may be determined according to a distance between the central axis of the media information and the central axis of the preset focus area. Therefore, the terminal obtains the distance between the central axis of the media information and the central axis of the preset focus area, and when the distance is less than a preset distance threshold, determines that the display position of the media information is located in the preset focus area; and when the distance is not less than the preset distance threshold, determines the display position of the media information is not located in the preset focus area. Because the area whose central axis coincides with the central axis of the information display interface is a middle area of the entire information display interface, when viewing the information display interface, the user first pays attention to the area. The area is used as the preset focus area, which is more in line with behavior habits of the user, and it is more convenient for the user to view the media information and the detailed information of the target item.

2. About the Detailed Information:

First, about content of the detailed information, the detailed information is used for presenting the target item, including related information of the target item, such as function introduction and a usage method of the target item, a ranking in the same category of items, and an item link for linking to a target item presentation interface. The user views the detailed information of the target item, understands the target item, and may further enter the target item presentation interface by triggering the item link. The target item is presented in more detail in the target item presentation interface; or the target item may be purchased in the target item presentation interface, and the target item is added to a shopping cart. In addition, the detailed information further includes a preset position, and the preset position is used for presenting the target item. However, to dynamically display the target item, before the detailed information is displayed, the preset position does not include the target item. In this case, the preset position may be a blank position, or may be a position in which other information in the detailed information is displaying. When the detailed information is subsequently displayed, a dynamic effect that the target item moves from the media information to the preset position in the detailed information is displayed. After the display of the dynamic effect ends, the preset position may include the target item. For example, before the detailed information is displayed, the preset position in the detailed information includes other information, and the dynamic effect that the target item moves from the media information to the preset position is displayed while the detailed information is displayed. In this case, a plurality of pieces of information in the detailed information are reorganized, and information originally displayed at the preset position is displayed at other positions. In this way, the preset position is vacant, to help the target item display at the preset position. In addition, about the display position of the detailed information, the detailed information is displayed at any position in the information display interface.

In some embodiments, the detailed information is displayed on one side of a specified direction of the media information through the information display interface. The specified direction includes at least one of left, right, above, or below, and may be set by the terminal by default or may be set by the user.

Figure 5:
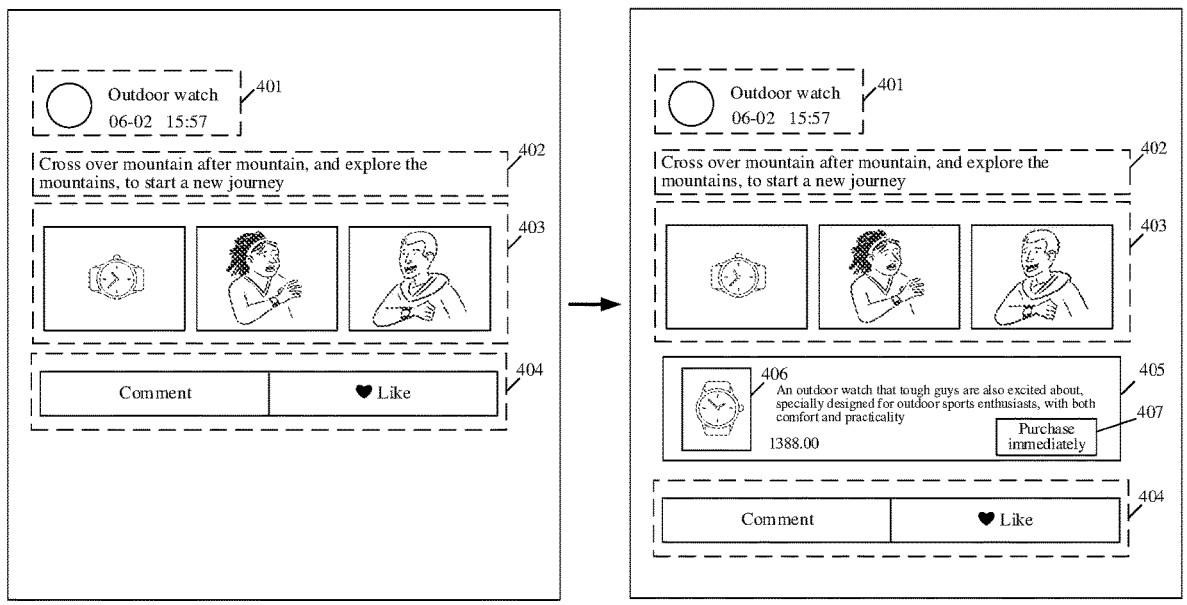
FIG. 5 is a schematic diagram of an information display interface according to one embodiment.

As shown in FIG. 5, an example in which the specified direction is "below" is used. When a display position of media information meets or satisfies a preset condition, an operation area 404 located below the media information moves downward, and detailed information 405 of a target item is displayed below the media information. The detailed information 405 includes introduction of the target item "An outdoor watch that tough guys are also excited about, specially designed for outdoor sports enthusiasts, with both comfort and practicality", a presentation picture 406 of the target item, a price "1388.00" of the target item, and a purchase option 407 of the target item. The presentation picture 406 currently does not include the target item, and the target item may be subsequently displayed.

Figure 6:
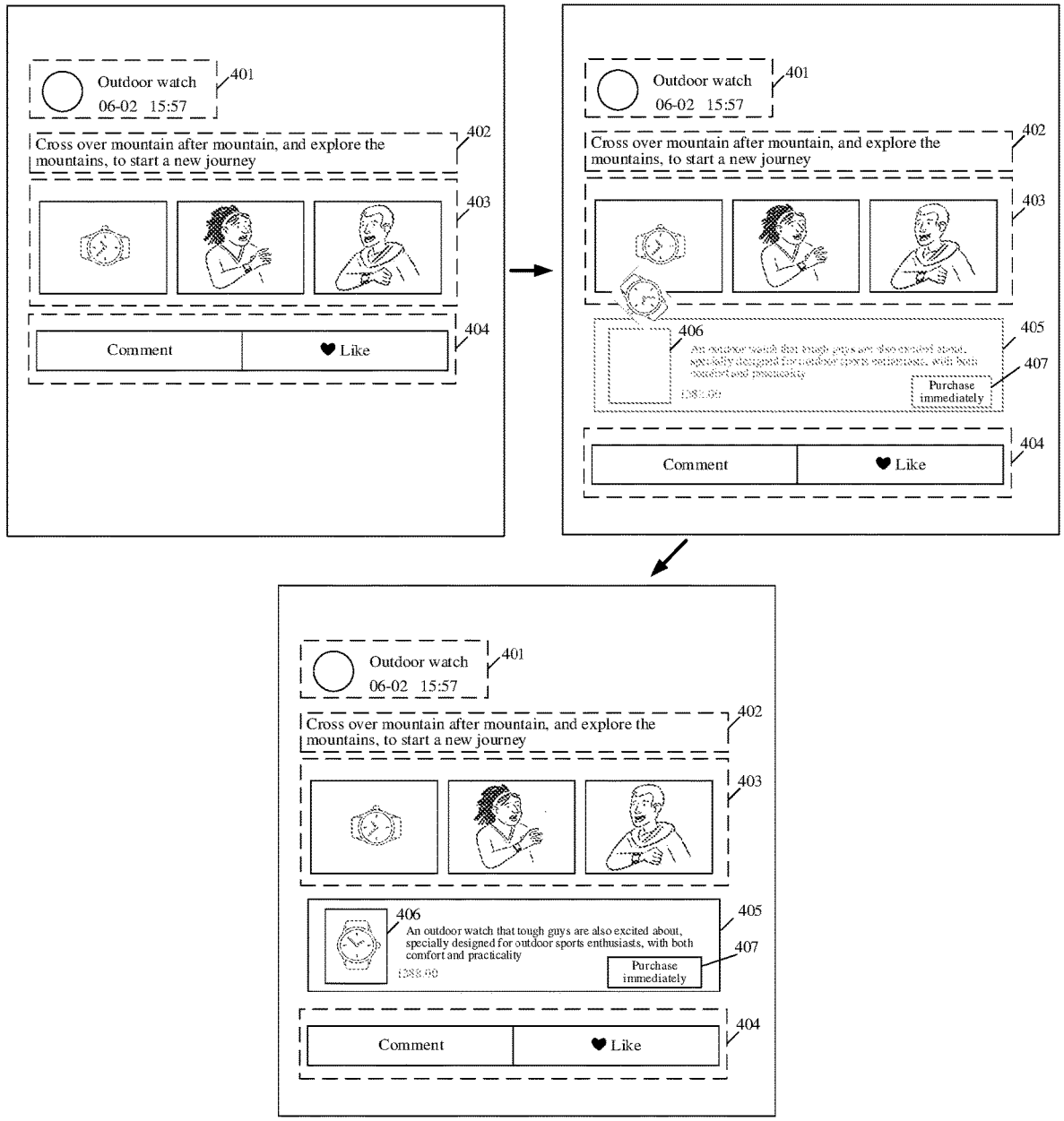
FIG. 6 is a schematic diagram of an information display interface according to one embodiment.

In some embodiments, the terminal displays, through an information display interface, a dynamic effect that the detailed information gradually moves in a specified direction from the display position of the media information, the detailed information is gradually displayed during movement, thereby implementing the dynamic display of the detailed information, and attracting users' attention. That the detailed information gradually moves in a specified direction means that a part of information that is currently displayed in the detailed information moves, and a remaining part of information that is not displayed is gradually displayed, until all information of the detailed information is displayed, so that the detailed information is transitioned from an incompletely displayed state to a completely displayed state. That the detailed information is gradually displayed means that the detailed information is transitioned from a transparent state to an opaque state. For example, the transparency of the detailed information starts from 100%, and is gradually reduced until the transparency of the detailed information is 0%. As shown in FIG. 6, the terminal displays, through an information display interface, a dynamic effect that the detailed information 405 gradually moves downward from a display position of media information, the detailed information 405 is gradually displayed during movement, thereby implementing the dynamic display of the detailed information, and attracting users' attention.

In addition, the detailed information may alternatively be displayed in the information display interface in the form of a card. The media information and the detailed information may be located on the same card, or may be located on different cards. If the media information and the detailed information are located on different cards, the two cards may be two cards that are closely adjacent, or may be two cards separated by at least one card.

303. The terminal displays a dynamic effect that the target item moves from the media information to a preset position in the detailed information while displaying the detailed information.

In this some embodiments, the detailed information is displayed, and a dynamic effect that the target item moves from the media information to a preset position in the detailed information is also displayed through the information display interface while the detailed information is displayed, thereby implementing the dynamic display of the target item, attracting users' attention, and improving the recommendation effect of the target item.

In some embodiments, the displaying a dynamic effect that the target item moves from the media information to a preset position in the detailed information while displaying the detailed information includes any one of the following manners:

First manner: obtaining a movement path of the target item, the movement path being from an original position of the target item to the preset position in the detailed information; and displaying a dynamic effect that the target item moves according to the movement path while displaying the detailed information.

When the media information is displayed, the target item is located in any picture in the media information, and a position of the target item in the picture is the original position of the target item. In addition, to implement the dynamic display of the target item, an end position of the target item is further provided in a target picture, that is, the preset position in the detailed information. Therefore, a movement path from the original position to the preset position may be obtained according to the original position and the preset position, and the target item is controlled to move according to the movement path, to display a dynamic effect that the target item moves according to the movement path, that is, a dynamic effect of moving from the media information to the preset position in the detailed information.

Second manner: obtaining a movement path and a rotation angle of the target item, the movement path being from an original position of the target item to the preset position in the detailed information, the rotation angle being determined by a first angle of the target item at the original position and a second angle at the preset position; and displaying a dynamic effect that the target item moves according to the movement path and rotates according to the rotation angle while displaying the detailed information. A manner in which the dynamic effect that the target item moves according to the movement path is displayed is similar to the foregoing first manner, as described with respect to other embodiments.

In addition, when the media information is displayed, the target item is located in any picture in the media information, and a position of the target item in the picture is the original position of the target item. In addition, at the original position, the target item has a predetermined presentation angle. For example, a front of the target item is parallel to the picture, that is, the picture is a front image of the target item; or a side of the target item is parallel to the picture, that is, the picture is a side image of the target item; or a top of the target item is upward or a top is downward. In addition, a presentation angle of the target item is further provided at the preset position, and it indicates that the target item needs to be displayed according to the presentation angle at the preset position. If a presentation angle of the target item at the original position in the media information is used as a first angle, and a presentation angle of the target item at the preset position is used as a second angle, a rotation angle of the target item is determined according to the first angle and the second angle, and a dynamic effect that the target item rotates according to the rotation angle is displayed while the detailed information is displayed. The rotation angle may be a difference between the first angle and the second angle. As the target item moves, the display position of the target item gradually changes, until the display position of the target item is located at the preset position. If the preset position now includes the target item, the dynamic display stops, provided that the media information and detailed information are statically displayed.

As shown in FIG. 6, a first angle of a watch at the original position is a horizontal angle (0 degrees), and a second angle in the presentation picture 406 is a vertical angle (270 degrees). If the two angles are inconsistent, a difference 270 degrees between the first angle and the second angle is used as a rotation angle of the watch, and a dynamic effect that the watch rotates counterclockwise during falling while the detailed information 405 is displayed, until the watch falls to the presentation picture 406.

According to the method provided in some embodiments, media information is displayed through an information display interface, detailed information of a target item is displayed through the information display interface when a display position of the media information meets a preset condition, and a dynamic effect that the target item moves from the media information to a preset position in the detailed information is displayed while the detailed information is displayed, thereby implementing the dynamic display of the target item, and enriching a display manner of the target item. This can attract users' attention, and obtain user' focus, thereby improving the recommendation effect of the target item. In addition, in a presentation scenario of reading fragmentation like an information flow, when a plurality of pieces of media information are displayed for users to view, users' attention can be effectively attracted in a manner of dynamically displaying the target item. In addition, by setting a preset focus area, the detailed information of the target item is displayed through the information display interface when the display position of the media information is located in the preset focus area of the information display interface, while a dynamic effect of the target item is displayed, to prevent item information from being displayed when the position of the media information in the information display interface does not attract the users' attention, causing that the users ignores the item information, thereby enhancing the display of the item information, and improving the recommendation effect of the target item. In addition, a dynamic effect that the detailed information gradually moves in a specified direction from the display position of the media information, and the detailed information is gradually displayed during movement is displayed through the information display interface, thereby enriching a page display effect, further attracting the users' attention, and improving the recommendation effect of the target item. In addition, by obtaining a movement path of the target item or obtaining a movement path and a rotation angle of the target item, while the detailed information is displayed, a dynamic effect that the target item moves according to the movement path is displayed, or a dynamic effect that the target item moves according to the movement path and rotates according to the rotation angle is displayed, thereby clarifying a display form of the dynamic effect.

The target item included in the media information is used as an example in the foregoing embodiments to describe a process of dynamically displaying the target item. However, considering the randomness and flexibility of publishing the media information, the item included in the media information and an item that has been stored in the detailed information may be slightly different in aspects such as an appearance, a color, and a shape. How to display the item naturally, truly, and dynamically becomes an urgent problem to be resolved. Another method for dynamically displaying the item is described below in a next embodiment.

Figure 7:
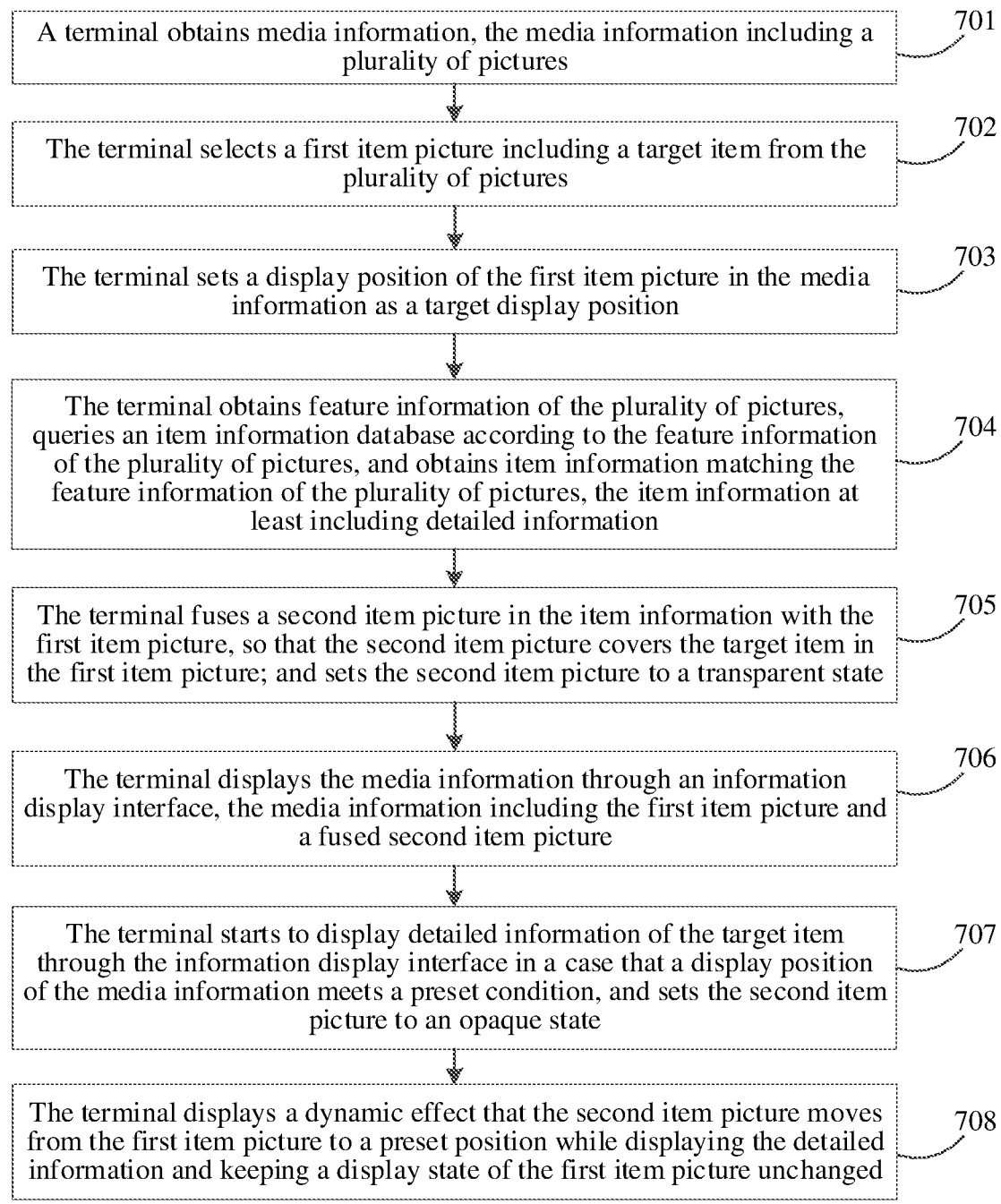
FIG. 7 is a flowchart of another item display method according to one embodiment.

FIG. 7 is a flowchart of another item display method according to one embodiment. An execution body of some embodiments is a terminal. Referring to FIG. 7, the method includes the following steps:

701. A terminal obtains media information, the media information including a plurality of pictures.

There are a plurality of manner in which the terminal obtains media information.

In some embodiments, if a terminal logs in to a server based on a user identifier, and the user inputs media information on the terminal, the terminal obtains the media information, may subsequently display the media information through an information display interface, and may further send the media information to the server. If the server publishes the media information, a terminal corresponding to another user identifier may alternatively display the media information. Alternatively, a terminal logs in to a server based on a user identifier, and a terminal corresponding to another user identifier sends media information to the server. If the server publishes the media information, the local terminal may alternatively receive the media information sent by the server, and may further subsequently display the media information through an information display interface. Alternatively, a terminal logs in to a server based on a user identifier, and the server obtains one or more pieces of media information in advance as to-be-recommended media information. If the server selects media information according to a recommendation algorithm, and sends the media information to the terminal, the terminal may receive the media information recommended by the server, and may further subsequently display the media information through an information display interface. In addition, the media information may not only include a plurality of pictures, but also include information in other forms such as a text and a video. This is not limited to this particular embodiment and may apply to other embodiments.

In some embodiments, the terminal provides an entry of the information display interface. If the user triggers the entry, and the terminal detects a trigger operation on the entry, the terminal displays the information display interface. In this case, the terminal obtains to-be-displayed media information, to display the media information through the information display interface. Alternatively, when the terminal displays the information display interface, the user performs a refresh operation, and the terminal detects the refresh operation to obtain updated media information, to display the media information through the information display interface. In addition, to implement the dynamic display of the target item, the terminal does not immediately display the media information when obtaining the media information, but performs processing by performing the following step 702 to step 705, and then displays the media information after the processing is completed.

702. The terminal selects a first item picture including a target item from the plurality of pictures.

In some embodiments, using an example in which at least one picture in the media information includes the target item, and to implement the dynamic display of the target item, the target item needs to be moved from a picture in which the target item is located to a preset position in detailed information. Therefore, a display position of the picture in which the target item is located matches a display position of the preset position in the detailed information, to ensure a smooth movement path of the target item. Therefore, the terminal selects a first item picture including the target item from the plurality of pictures in the media information, and may subsequently move the target item from the first item picture to the preset position in the detailed information.

In some embodiments, the media information includes the plurality of pictures. If one of the plurality of pictures includes the target item, the picture including the target item is used as the first item picture.

In some embodiments, the media information includes the plurality of pictures. If all of the plurality of pictures include the target item, one picture may be randomly selected from the plurality of pictures including the target item as the first item picture; or if the pictures in the media information have an arrangement order, and a first picture is selected according to the arrangement order from the plurality of pictures including the target item as the first item picture. Alternatively, each picture may not only include the target item, but also include other display elements, such as a character wearing the target item and a background of an environment in which the character is located. In addition, in the pictures, the target items may have different sizes, different angles, different colors, and other features. Therefore, the terminal presets an item presentation condition, and selects, according to the display elements in the plurality of pictures including the target item, a picture that meets the item presentation condition from the plurality of pictures as the first item picture.

In some embodiments, the item presentation condition may include: a difference degree between a color of the target item in the picture and colors of other display elements is greater than a preset threshold. The terminal obtains a difference degree between a color of the target item in each picture and the colors of other display elements according to the display elements in the plurality of pictures including the target item, determines whether the difference degree is greater than the preset threshold, and when the difference degree of any picture is greater than the preset threshold, uses the picture as the first item picture. Alternatively, the terminal uses a picture with a largest difference degree in a plurality of pictures whose difference degrees are less than the preset threshold as the first item picture when difference degrees of a plurality of pictures are greater than the preset threshold. By using the foregoing item presentation condition to select the picture, it is possible to select a picture with a relatively obvious difference between a foreground and a background, and when the target item is dynamically displayed based on the picture, the contrast can be enhanced, the uses' visual experience is improved, and the display effect is improved.

In some embodiments, the item presentation condition may include: an angle of the target item in the picture falls within a preset angle range, where the preset angle range may be determined according to a range of an angle when the item is displayed on the front. The terminal obtains, according to the angle of the target item in the plurality of pictures including the target item, a picture whose angle falls within the preset angle range as the first item picture. It needs to be added that for any picture, the terminal may recognize one or more display elements in the picture by using an item recognition algorithm, to determine an item included in the picture and an item type of the item. The item recognition algorithm is not limited in this particular embodiment and may apply to other embodiments.

703. The terminal sets a display position of the first item picture in the media information as a target display position.

The terminal may preset a target display position, so that the target display position matches the preset position in the detailed information. After the first item picture is selected, a display position of the first item picture in the media information is set as the target display position, the first item picture may be subsequently displayed at the target display position, and other information in the media information is displayed at other positions. When the target item moves from the target display position to the preset position, a movement path is smoother, which is more in line with users' behavior habits.

In some embodiments, the detailed information of the target item is located below the media information, and the preset position is located on a left side of the detailed information. The terminal sets the display position of the first item picture in the media information to a leftmost side, to match the preset position, so that the target item moves from the media information to the preset position. For example, as shown in FIG. 6, the media information includes three pictures, and all the three pictures include watches. However, the watch is presented on the front in a first picture, which is convenient for the users to view; and the watches in a second picture and a third picture may have a specific inclination angle, and are not displayed on the front, which is inconvenient for the users to view. Therefore, the first picture is selected as the first item picture, and a display position of the first picture in media information is set to a leftmost side, which is convenient for subsequent display that the watch falls from the picture on the leftmost side to a picture displayed on a left side of a watch link.

704. The terminal obtains feature information of the plurality of pictures, queries an item information database according to the feature information of the plurality of pictures, and obtains item information matching the feature information of the plurality of pictures, the item information at least including detailed information.

In some embodiments, when a target item is dynamically displayed, detailed information of the target item needs to be displayed. Therefore, the detailed information of the target item needs to be obtained first.

The terminal may obtain item information of one or more items in advance, and store the obtained item information in an item information database. The item information of each item includes detailed information, and the detailed information may include an item link, and does not include a background presentation picture, an item name, brand, and price, and the like of the target item. The detailed information is used for introducing the item. In addition, the item information may further include an item presentation picture that includes only the target item, a presentation picture obtained by fusing the background presentation picture and the item presentation picture, a display position of the item presentation picture in the presentation picture, and the like. For example, commodity information of a particular commodity includes a commodity link and a commodity picture. A background is divided from the commodity in the commodity picture, to obtain a background presentation picture that does not include the commodity and a commodity presentation picture that includes only the commodity, the commodity link and the background presentation picture are used as detailed information of the commodity, and the commodity link and the background presentation picture are displayed when the detailed information is displayed, without displaying the commodity presentation picture.

When obtaining media information, the terminal may obtain feature information of a plurality of pictures, queries an item information database according to the feature information of the plurality of pictures in the media information. In the item information database, item information matching the feature information of the plurality of pictures is item information of the target item. The feature information of each picture is used for describing the picture, and may represent features of display elements in the picture. The terminal may encode the picture by using an encoding algorithm, to obtain encoding information of the picture, and then perform feature extraction on the encoding information of the picture by using a preset feature extraction algorithm, to extract feature information of the picture. The encoding algorithm may be base 64 (where 64 printable characters based represent binary data) encoding algorithm or another encoding algorithm. The preset feature extraction algorithm may be scale-invariant feature transform (SIFT), speeded up robust features (SURF), a haar algorithm, or the like.

In addition, the terminal may further preset a plurality of dimensions of the feature information, to extract feature information of the picture according to the plurality of dimensions. The feature information may include information of the plurality of dimensions, and is used for describing the picture from the plurality of dimensions. The feature information may be regarded as high-dimensional feature information of the picture. The plurality of dimensions may include an item type, a picture style, a shape, a brand, and the like. For example, the item type is a watch, and the picture style is a fashion style.

In some embodiments, the terminal may use the feature information of the plurality of pictures as an input item of a preset algorithm, and queries the item information database by using the preset algorithm, to retrieve item information matching the feature information in the item information database. For example, the algorithm may be a PageRank algorithm or another algorithm.

In some embodiments, in the item information database, each item has an item keyword, and the item keyword and item information are stored correspondingly. The item keyword is watch, fashion style, youth style, or the like. When the item information database is queried according to the feature information of the plurality of pictures in the media information, a commodity keyword matching the feature information of the plurality of pictures is first obtained, that is, a target item corresponding to the media information may be determined, and item information corresponding to the commodity keyword is then obtained.

In some embodiments, a similarity between feature information of every two pictures in the plurality of pictures in the media information is obtained; and the item information database is queried according to the feature information of the plurality of pictures when the obtained similarity is greater than a preset similarity, and item information matching the feature information of the plurality of pictures is obtained.

For every two pictures, the obtained similarity is used for representing whether the two pictures are similar, to indicate whether items included in the two pictures are the same item. A higher similarity indicates that the items included in the two pictures are more likely to be the same item, and a lower similarity indicates that the items included in the two pictures are less likely to be the same item.

The terminal obtains the similarity between the feature information of every two pictures, that is, obtains at least one similarity, and determines whether each similarity is greater than a preset similarity. If each obtained similarity is greater than the preset similarity, it indicates that the plurality of pictures in the media information include the same item, and the media information is used for presenting the item. Therefore, the step of querying an item information database is performed, to obtain item information.

In another embodiment, when the obtained similarity is not greater than the preset similarity, the query is no longer performed based on the feature information of the plurality of pictures, and there is no need to obtain item information. For example, the similarity may be represented by using confidence. If confidence between every two pictures in the three pictures is greater than 60%, it indicates that the three pictures present the same item.

In addition, in some embodiments, the foregoing step 702 and step 703 may be alternatively performed after step 704. In step 704, an item information database is queried according to the feature information of the plurality of pictures when the obtained similarity is greater than a preset similarity, item information matching the feature information of the plurality of pictures is obtained, and step 702 of selecting a first item picture and step 703 of setting a display position of the first item picture are then performed. When the obtained similarity is not greater than the preset similarity, the step of querying an item information database is no longer performed, and there is no need to perform step 702 and step 703. In this case, the display position of the plurality of pictures in the media information may be set randomly or in other manners. This is not limited in this particular embodiment and may apply to other embodiments.

> 705. The terminal fuses a second item picture in the item information with the first item picture, so that the second item picture covers the target item in the first item picture; and sets the second item picture to a transparent state.

The item information further includes a second item picture. The second item picture is a picture that includes only a target item, for example, a commodity presentation picture. The second item picture includes only a target item without a background.

The terminal queries a second item picture according to the feature information of the plurality of pictures in the media information. The second item picture may be considered as a picture matching the media information. That is, the target item in the second item picture may be considered as the same item as the target item in the media information. A color, a size or another feature of the same item may be varied during the query. Therefore, although the target item in the second item picture and the target item in the media information are the same item, a difference may exist in color, size, or another feature.

In some embodiments, the terminal achieves, by changing a display position of the second item picture in the information display interface, a dynamic effect of displaying that the target item moves from the first item picture to the preset position in the detailed information.

In some embodiments, before the terminal starts to display the detailed information, the target item is located at an original position in the first item picture, and has coordinate information and size information. The coordinate information is used for indicating an original position of the target item, and the size information is used for indicating a size of the target item. For example, the coordinate information may be (20, 80), and the size information may be width: 200 pixels and height: 200 pixels. In addition, the second item picture also has size information. The size information is used for indicating a size of the second item picture, that is, a size of the target item in the second item picture.

The terminal obtains coordinate information and size information of the target item in the first item picture and size information of the second item picture, and adjusts a size of the second item picture according to the size information of the target item in the first item picture and the size information of the second item picture, so that the size of the second item picture is equal to a size of the target item in the first item picture, or the size of the second item picture is slightly less than a size of the target item in the first item picture. In addition, the terminal fuses the second item picture after a size adjustment with the first item picture, so that the second item picture covers all or some of an area of the target item in the first item picture.

In some embodiments, to dynamically display the second item picture while statically displaying the media information, the media information and the second item picture may be displayed in different layers. That is, if displaying the media information in a first interface picture layer, when fusing the second item picture with the first item picture, the terminal creates a second interface picture layer in an upper layer of the first interface picture layer, and displays the second item picture in the second interface picture layer.

In addition, before starting to display the detailed information, the terminal sets the second item picture to a transparent state, so that when the detailed information starts to be displayed, the user views only the target item, and cannot view the second item picture temporarily. The second item picture is located in the second interface picture layer. By setting transparency of the second interface picture layer to 100%, the second item picture may be set to the transparent state.

In addition, because the first item picture includes both the target item and the background, to prevent the second item picture from being displayed excessively abruptly in the first item picture, the terminal performs smoothing processing such as pixel transition processing or pixel filling processing on an edge of the second item picture in the second interface picture layer and an edge of a background area of the target item in the first item picture of the first interface picture layer, to ensure that the second item picture and the background area can be fluently and smoothly transitioned when the second item picture is displayed, thereby improving the display effect. The terminal performs smoothing processing according to a preset smoothing algorithm, where the preset smoothing algorithm is a weighted average algorithm, a feathering algorithm, or a Laplacian pyramid fusion algorithm.

In another embodiment, the terminal may further set a dynamic display condition, to determine whether the target item meets the dynamic display condition, so as to determine whether to dynamically display the target item. Therefore, when querying item information, the terminal may determine a dynamic display condition corresponding to the item information, and fuses a second item picture in the item information with a first item picture when the dynamic display condition is met, so that the second item picture is dynamically displayed subsequently. The terminal does not any longer fuse the second item picture with the first item picture when the dynamic display condition is not met, and does not any longer dynamically display the second item picture subsequently. The dynamic display condition may include a display time period, an item type of dynamic display, and the like. For example, a release condition is set for a commodity. If a commodity in the media information does not meet the release condition, for example, a current time point does not fall within a release time period of the commodity, a quantity of release times of the terminal reaches a maximum quantity of release times, or an amount required for releasing the commodity has been consumed, the dynamic display of the commodity is no longer performed.

706. The terminal displays the media information through an information display interface, the media information including the first item picture and a fused second item picture.

By performing the foregoing step 701 to step 705, media information and detailed information of the target item may be obtained. The media information includes a first item picture and a fused second item picture, and the detailed information includes an item link and a background presentation picture that does not include the target item. Next, display may be performed based on the obtained information. First, the terminal displays the media information through the information display interface. Because the display position of the first item picture in the media information has been set as a target display position, and the first item picture has been fused with the second item picture, the terminal displays the first item picture and the fused second item picture at the target display position. For information other than the first item picture in the media information, the information may be displayed at any display position in the media information. In this case, the user may view the media information. However, because the second item picture is currently in a transparent state, the user cannot view the second item picture.

707. The terminal starts to display detailed information of the target item through the information display interface when a display position of the media information meets a preset condition, and sets the second item picture to an opaque state.

For the process of displaying detailed information in step 707, refer to the foregoing step 302.

In some embodiments, before displaying the detailed information, the terminal sets the second item picture to a transparent state. When starting to display the detailed information, the terminal sets the second item picture to an opaque state, to start to display the second item picture. For example, the terminal first sets transparency of the second interface picture layer to 100%, thereby setting the second item picture to the transparent state. When starting to display the detailed information of the target item, the transparency of the second item picture is gradually reduced, and an adjustment of the transparency stops until the transparency of the second item picture is 0%. During the adjustment, the second item picture is in a semi-transparent state, and when the transparency is adjusted to 0%, the second item picture is in a completely opaque state.

708. The terminal displays a dynamic effect that the second item picture moves from the first item picture to the preset position in the detailed information while displaying the detailed information and keeping a display state of the first item picture unchanged.

The terminal displays, through a position change of the second item picture, a dynamic effect that the target item moves while displaying the detailed information. Because the first item picture and the second item picture are independent of each other, and do not affect each other, during the display of the dynamic effect, a display state of the first item picture is unchanged, and the target item may still be displayed in the first item picture.

In some embodiments, a dynamic effect that the second item picture moves from the first item picture to the preset position in the detailed information is displayed in the second interface picture layer of the information display interface, while the detailed information is displayed in the first interface picture layer. In some embodiments, the process of displaying a dynamic effect includes: obtaining a first picture frame, the first picture frame including the target item, the target item being located at an original position in the media information; obtaining a second picture frame, the second picture frame including the target item and the completely displayed detailed information, the target item being located at the preset position in the detailed information; and constructing a tween animation by using the first picture frame as a start frame and the second picture frame as an end frame, and playing the tween animation.

The tween animation technology is a technology for automatically filling animation frames between an animation start frame and an animation end frame according to the animation start frame and the animation end frame, and a set playback duration and a playback rate. The first picture frame may be obtained according to the media information currently displayed in the information display interface, while when obtaining the second picture frame, the terminal may add detailed information in the information display interface, and fuse the second item picture with a preset position in the detailed information, so that the target item is located at the preset position, and an information display interface obtained now is the second picture frame. In addition, when obtaining the second picture frame, the terminal still displays the first picture frame, and does not display the second picture frame. After subsequently displaying the tween animation, the terminal may display the second picture frame. For example, the background presentation picture that does not include the target item is displayed at the preset position, and the second item picture is fused with the background presentation picture, so that a presentation picture including the target item may be displayed in the obtained second picture frame. By using the tween animation technology, middle picture frames between the first picture frame and the second picture frame may be automatically filled according to the first picture frame and the second picture frame, to construct a complete tween animation. The tween animation includes a preset quantity of picture frames, and the picture frames are sequentially displayed according to a sequence, which may display a movement path that the target item moves from the media information to the preset position, so that the target item moves smoothly and stably.

In some embodiments, the terminal obtains information such as a size, a position, and an angle of the target item in the first item picture, and information such as an item size, a position, and an angle of an end position in a target picture, inputs the information as an input item into a preset curve function, and outputs a movement curve of the target item by using the preset curve function, to determine a position of the target item on each intermediate picture frame between the first picture frame and the second picture frame. The preset curve function may be a Bessel function or another function. For example, if the playback duration is 300 milliseconds (ms), and the playback rate is 200 picture frames within 1 s, 60 picture frames need to be played within 300 ms. Therefore, 58 middle picture frames are automatically filled according to the first picture frame and the second picture frame, to obtain a tween animation including 60 picture frames, and the tween animation is played according to a playback speed at which 200 picture frames are played within 1 s, to complete a dynamic effect of displaying that the target item moves.

An example in which an execution body of some embodiments is only the terminal is used. In another embodiment. The execution body may further include a terminal and a server, where the terminal is configured for display, and the server performs backend processing, such as querying detailed information, and fusing a first item picture with a second item picture. Through cooperation between the terminal and the server, the target item is dynamically displayed.

According to the method provided in some embodiments, media information is displayed through an information display interface, detailed information of a target item is displayed through the information display interface when a display position of the media information meets a preset condition, and a dynamic effect that the target item moves from the media information to a preset position in the detailed information is displayed while the detailed information is displayed, thereby implementing the dynamic display of the target item, and enriching a display manner of the target item. This can attract users' attention, and obtain user' focus, thereby improving the recommendation effect of the target item. In addition, by using a tween animation technology, picture frames are automatically filled, to play a tween animation, thereby completely displaying the dynamic effect that the target item moves from the media information to the preset position in the detailed information, and perfecting details in this solution. In addition, a position of a second item picture in a second interface picture layer on the information display interface is changed while the detailed information is displayed in a first interface picture layer, thereby achieving the dynamic effect of displaying that the target item moves from the media information to the preset position in the detailed information. In addition, the second item picture is fused with a first item picture, so that the second item picture covers a target item in the first item picture, and the second item picture is set to a transparent state, for making a basic preparation for subsequently displaying the movement of the target item. Subsequently, the second item picture may be set to an opaque state, to show an effect that the target item is gradually displayed.

Figure 8:
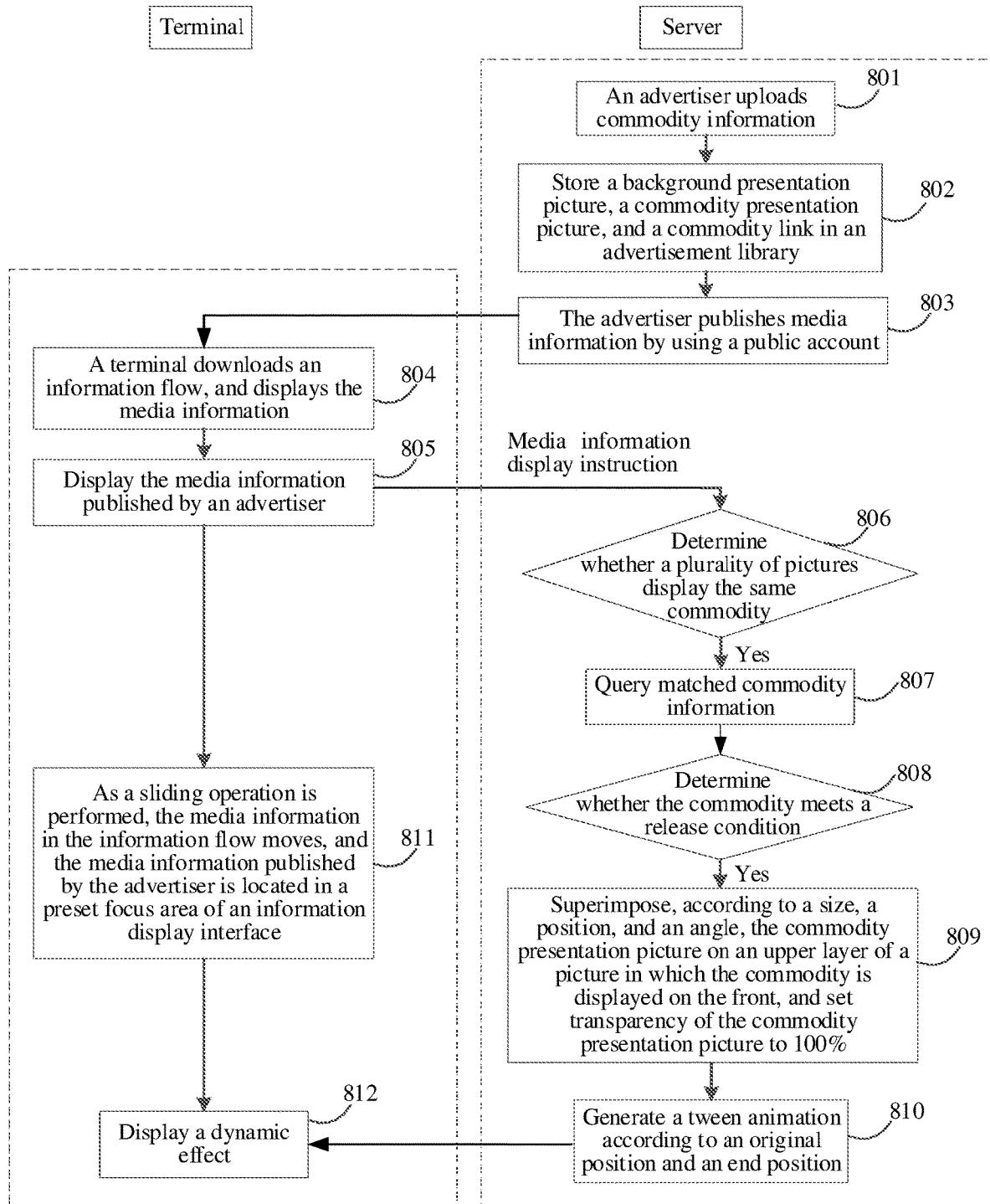
FIG. 8 is a flowchart of another item display method according to one embodiment.

FIG. 8 is a flowchart of another item display method according to one embodiment. An execution body of some embodiments includes a terminal and a server, and an example in which an advertisement is released is used in some embodiments. Referring to FIG. 8, the method includes the following steps:

801. An advertiser uploads commodity information to a server, including a commodity picture and a commodity link, the commodity picture including a commodity and a background, the commodity link being used for linking to a detailed presentation interface of the commodity.

802. The server divides the commodity from the background in the commodity picture, to obtain a background presentation picture and a commodity presentation picture, and stores the background presentation picture, the commodity presentation picture, and the commodity link in an advertisement library.

803. The advertiser publishes media information on the server by using a public account, the media information including three pictures of the commodity.

804. A terminal of a user downloads an information flow from the server, displays, through an information display interface, one or more pieces of media information included in the information flow, and performs step 804 and step 811.

805. The terminal determines the media information that needs to be displayed and is published by the advertiser, and sends a media information display instruction to the server.

806. The server receives the media information display instruction, determines, according to feature information of a plurality of pictures in the media information, whether the plurality of pictures display the same commodity, and if yes, performs step 807.

807. The server queries matched commodity information according to a match between the feature information of the plurality of pictures and the commodity information in the advertisement library.

808. The server determines whether the commodity meets a release condition, and if yes, performs step 809.

809. The server selects a picture in which the commodity is displayed on the front from the plurality of pictures in the media information, superimposes, according to a size, a position, and an angle of the commodity presentation picture in the commodity information, and a size, a position, and an angle of the commodity that is displayed on the front in the media information, the commodity presentation picture on an upper layer of the picture in which the commodity is displayed on the front, and sets transparency of the commodity presentation picture to 100%.

810. The server generates a tween animation according to an original position of the commodity in the media information and an end position of the commodity in the background presentation picture of the commodity link, and sends the tween animation to the terminal.

811. The user performs a sliding operation on the information display interface of the terminal. As the sliding operation is performed, the media information in the information flow moves, and the media information published by the advertiser is located in a preset focus area of the information display interface.

812. The terminal gradually displays the commodity link and the background presentation picture below the media information, also displays a dynamic effect that the commodity presentation picture falls from the media information to the background presentation picture and the transparency is gradually reduced, and stops dynamic display until the commodity presentation picture is located at the end position of the background presentation picture, and the transparency is 0%. In this case, the commodity presentation picture is fused with the background presentation picture into a commodity picture, and the commodity picture and the commodity link may be statically displayed in the media information.

Figure 9:
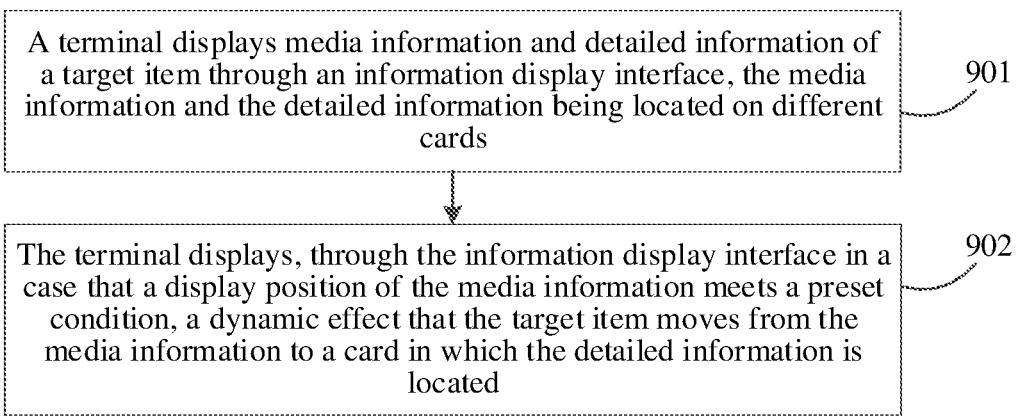
FIG. 9 is a flowchart of another item display method according to one embodiment.

FIG. 9 is a flowchart of another item display method according to one embodiment. An execution body of some embodiments is a terminal. Referring to FIG. 9, the method includes the following steps:

901. A terminal displays media information and detailed information of a target item through an information display interface, the media information and the detailed information being located on different cards, where the media information includes at least one picture, and the at least one picture in the media information include a target item. The detailed information and the media information are separately displayed in the information display interface in the form of cards. The two cards may be two cards that are closely adjacent, or may be two cards separated by at least one card. The card refers to a display area used for displaying a set of information in the information display interface, a shape of the card may be a box such as a rectangle or a square, and information, such as the media information and the detailed information, included in the card is displayed in the box. The information included in the card may include a text, a picture, a video, and other types, and the card further has display styles, including a text color, a background color, an icon style, a border style, and the like. Display styles of different cards may be the same or different. Description is made by using an example in which both the media information and the detailed information are displayed in the information display interface in step 901, and a display timing of the media information and the detailed information may not be limited in some embodiments.

In some embodiments, the displaying media information and detailed information of a target item through an information display interface includes: displaying, through the information display interface, the media information, and displaying the detailed information on one side of a specified direction of the media information, the specified direction including at least one of left, right, above, or below. In some embodiments, the displaying, through the information display interface, the media information, and displaying the detailed information on one side of a specified direction of the media information includes: displaying media information through a first card in the information display interface; and displaying a second card on one side of a specified direction of the first card through the information display interface, and displaying, in the second card, a dynamic effect that the detailed information gradually moves in the specified direction from a display position of the media information, and the detailed information is gradually displayed during movement. A specific manner of displaying the media information and the detailed information in step 901 may be similar to that in the foregoing step 301, as described with respect to other embodiments.

902. The terminal displays, through the information display interface when a display position of the media information meets a preset condition, a dynamic effect that the target item moves from the media information to a card in which the detailed information is located.

In some embodiments, the card in which the detailed information is located is provided with a preset position. The preset position is used for presenting the target item. However, to dynamically display the target item, before the detailed information is displayed, the preset position does not include the target item. In this case, the preset position may be a blank position, or may be a position in which other information in the card is displaying. A dynamic effect that the target item moves from the media information to the preset position is subsequently displayed. After the display of the dynamic effect ends, the preset position may include the target item. Therefore, the preset position is an end position of the target item.

For example, a preset position in the card in which the detailed information is located includes other information. When the display position of the media information meets the preset condition, the dynamic effect that the target item moves from the media information to the preset position is displayed. In this case, information in the card is reorganized, and information originally displayed at the preset position is displayed at other positions. In this way, the preset position is vacant, to help the target item display at the preset position.

In some embodiments, the displaying, through the information display interface, a dynamic effect that the target item moves from the media information to a card in which the detailed information is located includes: obtaining a movement path of the target item, the movement path being from an original position of the target item to the end position in the card in which the detailed information is located; and displaying a dynamic effect that the target item moves according to the movement path.

In some embodiments, the displaying, through the information display interface, a dynamic effect that the target item moves from the media information to a card in which the detailed information is located includes: obtaining a movement path and a rotation angle of the target item, the movement path being from an original position of the target item to the end position in the card in which the detailed information is located, the rotation angle being determined by a first angle of the target item at the original position and a second angle at the end position; and displaying a dynamic effect that the target item moves according to the movement path and rotates according to the rotation angle.

In some embodiments, the displaying, through the information display interface, a dynamic effect that the target item moves from the media information to a card in which the detailed information is located includes: obtaining a first picture frame, the first picture frame including the target item, the target item being located at an original position in the media information; obtaining a second picture frame, the second picture frame including the target item and the completely displayed detailed information, the target item being located at the end position in the card in which the detailed information is located; and constructing a tween animation by using the first picture frame as a start frame and the second picture frame as an end frame, and playing the tween animation.

In some embodiments, the media information and the detailed information are located in a first interface picture layer of the information display interface, and the displaying, through the information display interface, a dynamic effect that the target item moves from the media information to a card in which the detailed information is located includes: displaying, in a second interface picture layer of the information display interface, the dynamic effect that the target item moves from the media information to the card in which the detailed information is located.

In some embodiments, before the displaying media information and detailed information of a target item through an information display interface, the method further includes: obtaining the media information, the media information including a plurality of pictures; selecting a first item picture including the target item from the plurality of pictures; setting a display position of the first item picture in the media information as a target display position, the target display position matching the preset position in the detailed information; and obtaining feature information of the plurality of pictures, querying an item information database according to the feature information of the plurality of pictures, and obtaining item information matching the feature information of the plurality of pictures, the item information at least including the detailed information.

The displaying media information and detailed information of a target item through an information display interface includes: displaying, through the information display interface, the first item picture at the target display position of the media information, and displaying the detailed information.

In some embodiments, the item information further includes a second item picture, and the method further includes: fusing the second item picture with the first item picture, so that the second item picture covers the target item in the first item picture; and setting the second item picture to a transparent state.

In some embodiments, the displaying, through the information display interface, a dynamic effect that the target item moves from the media information to a card in which the detailed information is located includes: setting the second item picture to an opaque state; and displaying a dynamic effect that the second item picture moves from the first item picture to the card in which the detailed information is located while keeping a display state of the first item picture unchanged.

In some embodiments, the querying an item information database according to the feature information of the plurality of pictures, and obtaining item information matching the feature information of the plurality of pictures includes: obtaining a similarity between feature information of every two pictures in the plurality of pictures; and querying the item information database according to the feature information of the plurality of pictures when the obtained similarity is greater than a preset similarity, and obtaining the item information matching the feature information of the plurality of pictures. A particular manner of displaying the dynamic effect in step 902 is similar to that in the foregoing step 302, as described with respect to other embodiments.

According to the method, the apparatus, the computer device, and the storage medium provided in some embodiments, media information is displayed through an information display interface, detailed information of a target item is displayed through the information display interface when a display position of the media information meets a preset condition, and a dynamic effect that the target item moves from the media information to a card in which the detailed information is located is displayed while the detailed information is displayed, thereby implementing the dynamic display of the target item, and enriching a display manner of the target item. This can attract users' attention, and obtain user' focus, thereby improving the recommendation effect of the target item. In addition, in a presentation scenario of reading fragmentation like an information flow, when a plurality of pieces of media information are displayed for users to view, users' attention can be effectively attracted in a manner of dynamically displaying the target item.

In addition, by setting a preset focus area, the detailed information of the target item is displayed through the information display interface when the display position of the media information is located in the preset focus area of the information display interface, while a dynamic effect of the target item is displayed, to prevent item information from being displayed when the position of the media information in the information display interface does not attract the users' attention, causing that the users ignores the item information, thereby enhancing the display of the item information, and improving the recommendation effect of the target item.

In addition, a dynamic effect that the detailed information gradually moves in a specified direction from the display position of the media information, and the detailed information is gradually displayed during movement is displayed through the information display interface, thereby enriching a page display effect, further attracting the users' attention, and improving the recommendation effect of the target item. In addition, by obtaining a movement path and a rotation angle of the target item, a dynamic effect that the target item moves according to the movement path and rotates according to the rotation angle is displayed while the detailed information is displayed, thereby clarifying a display form of the dynamic effect. In addition, by using a tween animation technology, picture frames are automatically filled, to play a tween animation, thereby completely displaying the dynamic effect that the target item moves from the media information to the card in which the detailed information is located, and perfecting details in this solution. In addition, a position of a second item picture in a second interface picture layer on the information display interface is changed while the detailed information is displayed in a first interface picture layer, thereby achieving the dynamic effect of displaying that the target item moves from the media information to the card in which the detailed information is located. In addition, the second item picture is fused with a first item picture, so that the second item picture covers a target item in the first item picture, and the second item picture is set to a transparent state, for making a basic preparation for subsequently displaying the movement of the target item. Subsequently, the second item picture may be set to an opaque state, to show an effect that the target item is gradually displayed.

Figure 10:
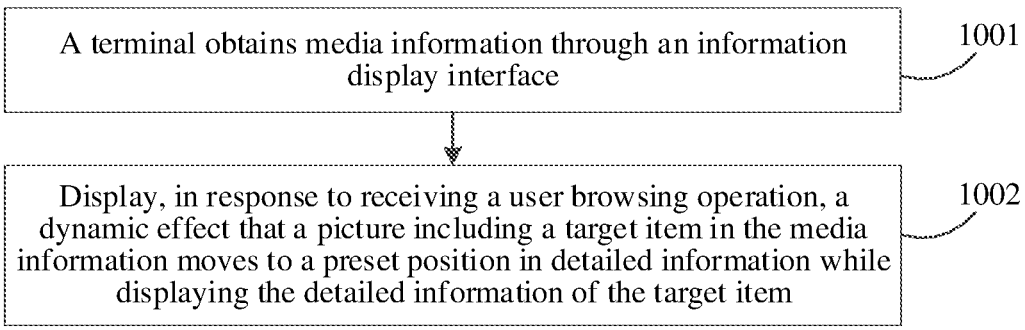
FIG. 10 is a flowchart of another item display method according to one embodiment.

FIG. 10 is a flowchart of another item display method according to one embodiment. An execution body of some embodiments is a terminal. Referring to FIG. 10, the method includes the following steps:

1001. A terminal obtains media information through an information display interface.

The media information includes at least one picture, and the at least one picture in the media information include a target item. A particular manner of displaying the media information in step 1001 is similar to these in the foregoing step 301 and step 901, as described with respect to other embodiments.

1002. Display, in response to receiving a user browsing operation, a dynamic effect that a picture including a target item in the media information moves to a preset position in detailed information while displaying the detailed information of the target item.

The user browsing operation may be a sliding operation of the user in the information display interface, an operation of the user clicking on the media information, an operation that the user presses and holds any position in the information display interface, an operation that the user presses and holds the media information, or the like. When the terminal receives the user browsing operation, and it indicates that the user intends to browse the media information, the detailed information of the target item is displayed, and the dynamic effect that the picture including the target item in the media information moves to the preset position in the detailed information is also displayed, to dynamically display the target item. This attracts users' attention, thereby improving the recommendation effect of the target item.

In some embodiments, the displaying a dynamic effect that a picture including the target item in the media information moves to a preset position in detailed information while displaying the detailed information of the target item includes: displaying a dynamic effect that the picture including the target item in the media information moves to the preset position in the detailed information while displaying the detailed information on one side of a specified direction of the media information through the information display interface, the specified direction including at least one of left, right, above, or below.

In some embodiments, the displaying the detailed information on one side of a specified direction of the media information through the information display interface includes: displaying, through the information display interface, a dynamic effect that the detailed information gradually moves in the specified direction from the display position of the media information, and the detailed information is gradually displayed during movement.

In some embodiments, the displaying a dynamic effect that a picture including the target item in the media information moves to a preset position in detailed information while displaying the detailed information of the target item includes: obtaining a movement path of the target item, the movement path being from an original position of the picture including the target item to the preset position in the detailed information; and displaying a dynamic effect that the picture including the target item moves according to the movement path while displaying the detailed information.

In some embodiments, the displaying a dynamic effect that a picture including the target item in the media information moves to a preset position in detailed information while displaying the detailed information of the target item includes: obtaining a movement path and a rotation angle of the target item, the movement path being from an original position of picture including the target item to the preset position in the detailed information, the rotation angle being determined by a first angle of the target item at the original position and a second angle at the preset position; and displaying a dynamic effect that the picture including the target item moves according to the movement path and rotates according to the rotation angle while displaying the detailed information.

In some embodiments, the displaying a dynamic effect that a picture including a target item moves from the media information to a preset position in detailed information while displaying the detailed information includes: obtaining a first picture frame, the first picture frame including the target item, the picture including the target item being located at an original position in the media information; obtaining a second picture frame, the second picture frame including the target item and the completely displayed detailed information, the picture including the target item being located at the preset position in the detailed information; and constructing a tween animation by using the first picture frame as a start frame and the second picture frame as an end frame, and playing the tween animation.

In some embodiments, the media information is located in a first interface picture layer of the information display interface, and the displaying a dynamic effect that the picture including the target item moves from the media information to a preset position in the detailed information while displaying the detailed information includes: displaying, in a second interface picture layer of the information display interface, a dynamic effect that the picture including the target item moves from the media information to the preset position while displaying the detailed information in the first interface picture layer.

In some embodiments, before the displaying media information through an information display interface, the method further includes: obtaining the media information, the media information including a plurality of pictures; selecting a first item picture including the target item from the plurality of pictures; and setting a display position of the first item picture in the media information as a target display position, the target display position matching the preset position in the detailed information; and the displaying media information through an information display interface includes: displaying the first item picture at the target display position of the media information through the information display interface.

In some embodiments, the media information includes a plurality of pictures, and the method further includes: obtaining feature information of the plurality of pictures; and querying an item information database according to the feature information of the plurality of pictures, and obtaining item information matching the feature information of the plurality of pictures, the item information at least including the detailed information.

In some embodiments, a first item picture in the media information includes the target item, the item information further includes a second item picture, and the method further includes: fusing the second item picture with the first item picture, so that the second item picture covers the target item in the first item picture; and setting the second item picture to a transparent state.

In some embodiments, the displaying a dynamic effect that a picture including the target item in the media information moves to a preset position in detailed information while displaying the detailed information of the target item includes: setting the second item picture to an opaque state; and displaying a dynamic effect that the second item picture moves from the first item picture to the preset position in the detailed information while keeping a display state of the first item picture unchanged.

In some embodiments, the querying an item information database according to the feature information of the plurality of pictures, and obtaining item information matching the feature information of the plurality of pictures includes: obtaining a similarity between feature information of every two pictures in the plurality of pictures; and querying the item information database according to the feature information of the plurality of pictures when the obtained similarity is greater than a preset similarity, and obtaining the item information matching the feature information of the plurality of pictures.

According to the method, the apparatus, the computer device, and the storage medium provided in some embodiments, media information is displayed through an information display interface, and in response to receiving a user browsing operation, a dynamic effect that a picture including a target item in the media information moves from the media information to a preset position in detailed information is displayed while the detailed information of the target item is displayed, thereby implementing the dynamic display of the target item, and enriching a display manner of the target item. This can attract users' attention, and obtain user' focus, thereby improving the recommendation effect of the target item.

In addition, in a presentation scenario of reading fragmentation like an information flow, when a plurality of pieces of media information are displayed for users to view, users' attention can be effectively attracted in a manner of dynamically displaying the target item. In addition, a dynamic effect that the detailed information gradually moves in a specified direction from the display position of the media information, and the detailed information is gradually displayed during movement is displayed through the information display interface, thereby enriching a page display effect, further attracting the users' attention, and improving the recommendation effect of the target item. In addition, by obtaining a movement path and a rotation angle of the target item, a dynamic effect that the target item moves according to the movement path and rotates according to the rotation angle is displayed while the detailed information is displayed, thereby clarifying a display form of the dynamic effect. In addition, by using a tween animation technology, picture frames are automatically filled, to play a tween animation, thereby completely displaying the dynamic effect that the picture including the target item moves to the preset position in the detailed information, and perfecting details in this solution. In addition, a position of a second item picture in a second interface picture layer on the information display interface is changed while the detailed information is displayed in a first interface picture layer, thereby achieving the dynamic effect of displaying that the picture including the target item moves to the preset position in the detailed information. In addition, the second item picture is fused with a first item picture, so that the second item picture covers a target item in the first item picture, and the second item picture is set to a transparent state, for making a basic preparation for subsequently displaying the movement of the target item. Subsequently, the second item picture may be set to an opaque state, to show an effect that the target item is gradually displayed.

Figure 11:
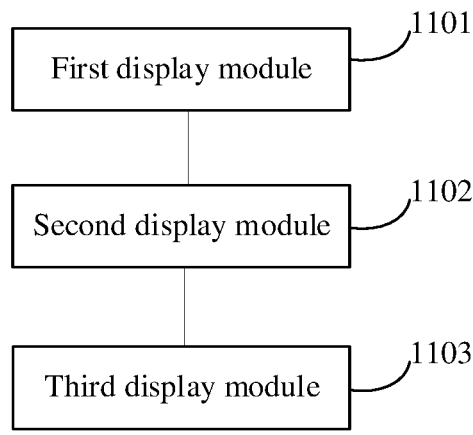
FIG. 11 is a schematic structural diagram of an item display apparatus according to one embodiment.

FIG. 11 is a schematic structural diagram of an item display apparatus according to one embodiment. Referring to FIG. 11, the apparatus includes:
- a first display module 1101, configured to display media information through an information display interface, the media information including at least one picture, the at least one picture in the media information including a target item;
- a second display module 1102, configured to display detailed information of the target item through the information display interface when a display position of the media information meets a preset condition; and
- a third display module 1103, configured to display a dynamic effect that the target item moves from the media information to a preset position in the detailed information while displaying the detailed information.

The term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

Figure 12:
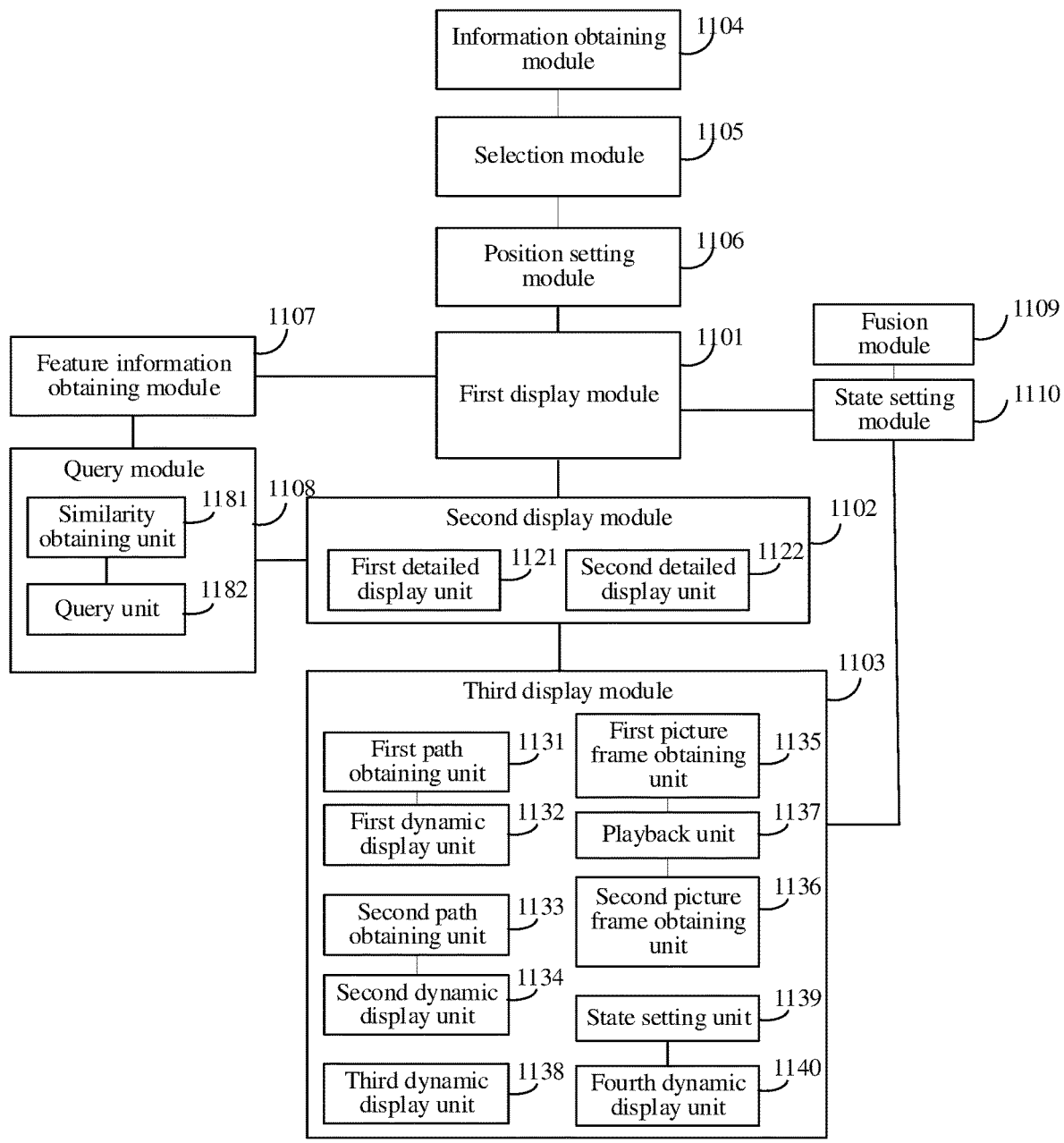
FIG. 12 is a schematic structural diagram of another item display apparatus according to one embodiment.

In some embodiments, as shown in FIG. 12, the second display module 1102 includes:
- a first detailed display unit 1121, configured to display the detailed information of the target item through the information display interface when the display position of the media information is located in a preset focus area of the information display interface.

In some embodiments, as shown in FIG. 12, the second display module 1102 includes:
- a second detailed display unit 1122, configured to display the detailed information on one side of a specified direction of the media information through the information display interface, the specified direction including at least one of left, right, above, or below.

In some embodiments, as shown in FIG. 12, the second detailed display unit 1122 is configured to display, through the information display interface, a dynamic effect that the detailed information gradually moves in the specified direction from the display position of the media information, and the detailed information is gradually displayed during movement.

In some embodiments, as shown in FIG. 12, the third display module 1103 includes:
- a first path obtaining unit 1131, configured to obtain a movement path of the target item, the movement path being from an original position of the target item to the preset position in the detailed information; and a first dynamic display unit 1132, configured to display a dynamic effect that the target item moves according to the movement path while displaying the detailed information.

In some embodiments, as shown in FIG. 12, the third display module 1103 includes:
a second path obtaining unit 1133, configured to obtain a movement path and a rotation angle of the target item, the movement path being from an original position of the target item to the preset position in the detailed information, the rotation angle being determined by a first angle of the target item at the original position and a second angle at the preset position; and
a second dynamic display unit 1134, configured to display a dynamic effect that the target item moves according to the movement path and rotates according to the rotation angle while displaying the detailed information.

In some embodiments, as shown in FIG. 12, the third display module 1103 includes:
a first picture frame obtaining unit 1135, configured to obtain a first picture frame, the first picture frame including the target item, the target item being located at an original position in the media information;
a second picture frame obtaining unit 1136, configured to obtain a second picture frame, the second picture frame including the target item and the completely displayed detailed information, the target item being located at the preset position in the detailed information; and
a playback unit 1137, configured to construct a tween animation by using the first picture frame as a start frame and the second picture frame as an end frame, and play the tween animation.

In some embodiments, as shown in FIG. 12, the media information is located in a first interface picture layer of the information display interface, and the third display module 1103 includes:
a third dynamic display unit 1138, configured to display, in a second interface picture layer of the information display interface, a dynamic effect that the target item moves from the media information to the preset position in the detailed information while displaying the detailed information in the first interface picture layer.

In some embodiments, as shown in FIG. 12, the apparatus further includes:
an information obtaining module 1104, configured to obtain media information, the media information including a plurality of pictures;
a selection module 1105, configured to select a first item picture including the target item from the plurality of pictures;
a position setting module 1106, configured to set a display position of the first item picture in the media information as a target display position, the target display position matching the preset position in the detailed information; and
the first display module 1101, further configured to display the first item picture at the target display position of the media information through the information display interface.

In some embodiments, as shown in FIG. 12, the media information includes a plurality of pictures, and the apparatus further includes:
a feature information obtaining module 1107, configured to obtain feature information of the plurality of pictures; and a query module 1108, configured to query an item information database according to the feature information of the plurality of pictures, and obtain item information matching the feature information of the plurality of pictures, the item information at least including the detailed information.

In some embodiments, as shown in FIG. 12, a first item picture in the media information includes the target item, the item information further includes a second item picture, and the apparatus further includes:
a fusion module 1109, configured to fuse the second item picture with the first item picture, so that the second item picture covers the target item in the first item picture; and
a state setting module 1110, configured to set the second item picture to a transparent state.

In some embodiments, as shown in FIG. 12, the third display module 1103 includes:
a state setting unit 1139, configured to set the second item picture to an opaque state when the detailed information starts to be displayed; and
a fourth dynamic display unit 1140, configured to display a dynamic effect that the second item picture moves from the first item picture to the preset position while displaying the detailed information and keeping a display state of the first item picture unchanged.

In some embodiments, as shown in FIG. 12, the query module 1108 includes:
a similarity obtaining unit 1181, configured to obtain a similarity between feature information of every two pictures in the plurality of pictures; and
a query unit 1182, configured to query the item information database according to the feature information of the plurality of pictures when the obtained similarity is greater than a preset similarity, and obtain the item information matching the feature information of the plurality of pictures.

Figure 13:
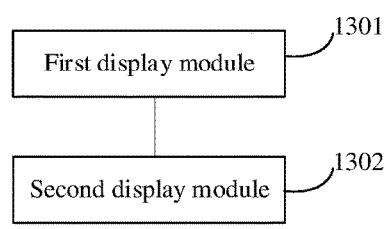
FIG. 13 is a schematic structural diagram of an item display apparatus according to one embodiment.

FIG. 13 is a schematic structural diagram of an item display apparatus according to one embodiment. Referring to FIG. 13, the apparatus includes:
a first display module 1301, configured to display media information and detailed information of a target item through an information display interface, the media information including at least one picture, the at least one picture in the media information including the target item, and the media information and the detailed information being located on different cards; and
a second display module 1302, configured to display, through the information display interface when a display position of the media information meets a preset condition, a dynamic effect that the target item moves from the media information to a card in which the detailed information is located.

Figure 14:
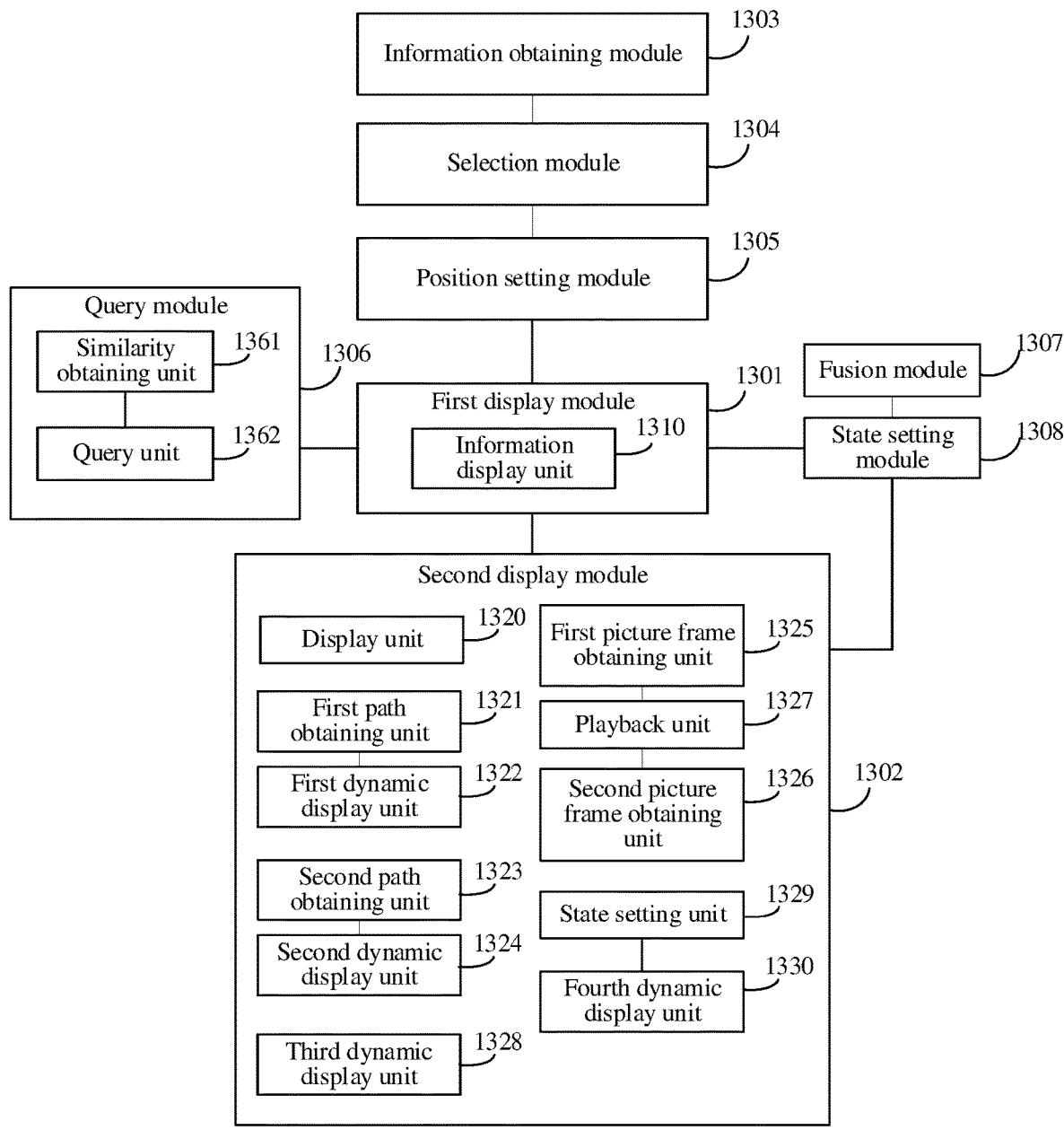
FIG. 14 is a schematic structural diagram of another item display apparatus according to one embodiment.

In some embodiments, as shown in FIG. 14, the second display module 1302 includes:
a display unit 1320, configured to display, through the information display interface when a display position of the media information is located in a preset focus area of the information display interface, a dynamic effect that the target item moves from the media information to a card in which the detailed information is located.

In some embodiments, as shown in FIG. 14, the first display module 1301 includes:
an information display unit 1310, configured to display, through the information display interface, the media information, and display the detailed information on one side of a specified direction of the media information, the specified direction including at least one of left, right, above, or below.

In some embodiments, as shown in FIG. 14, the information display unit 1310 is configured to:

display media information through a first card in the information display interface; and display a second card on one side of a specified direction of the first card through the information display interface, and display, in the second card, a dynamic effect that the detailed information gradually moves in the specified direction from a display position of the media information, and the detailed information is gradually displayed during movement.

In some embodiments, as shown in FIG. 14, the second display module 1302 includes:

a first path obtaining unit 1321, configured to obtain a movement path of the target item, the movement path being from an original position of the target item to an end position in the card in which the detailed information is located; and a first dynamic display unit 1322, configured to display a dynamic effect that the target item moves according to the movement path.

In some embodiments, as shown in FIG. 14, the second display module 1302 includes:

a second path obtaining unit 1323, configured to obtain a movement path and a rotation angle of the target item, the movement path being from an original position of the target item to the end position in the card in which the detailed information is located, the rotation angle being determined by a first angle of the target item at the original position and a second angle at the end position; and a second dynamic display unit 1324, configured to display a dynamic effect that the target item moves according to the movement path and rotates according to the rotation angle.

In some embodiments, as shown in FIG. 14, the second display module 1302 includes:

a first picture frame obtaining unit 1325, configured to obtain a first picture frame, the first picture frame including the target item, the target item being located at an original position in the media information;

a second picture frame obtaining unit 1326, configured to obtain a second picture frame, the second picture frame including the target item and the completely displayed detailed information, the target item being located at the end position in the card in which the detailed information is located; and a playback unit 1327, configured to construct a tween animation by using the first picture frame as a start frame and the second picture frame as an end frame, and play the tween animation.

In some embodiments, as shown in FIG. 14, the media information and the detailed information are located in a first interface picture layer of the information display interface, and the second display module 1302 includes:

a third dynamic display unit 1328, configured to display, in a second interface picture layer of the information display interface, the dynamic effect that the target item moves from the media information to the card in which the detailed information is located.

In some embodiments, as shown in FIG. 14, the apparatus further includes:

an information obtaining module 1303, configured to obtain media information, the media information including a plurality of pictures;

a selection module 1304, configured to select a first item picture including the target item from the plurality of pictures;

a position setting module 1305, configured to set a display position of the first item picture in the media information as a target display position, the target display position matching the preset position in the detailed information;

a query module 1306, configured to obtain feature information of the plurality of pictures, query an item information database according to the feature information of the plurality of pictures, and obtain item information matching the feature information of the plurality of pictures, the item information at least including the detailed information; and the first display module 1301, further configured to: display, through the information display interface, the first item picture at the target display position of the media information, and display the detailed information.

In some embodiments, as shown in FIG. 14, the item information further includes a second item picture, and the apparatus further includes:

a fusion module 1307, configured to fuse the second item picture with the first item picture, so that the second item picture covers the target item in the first item picture; and a state setting module 1308, configured to set the second item picture to a transparent state.

In some embodiments, as shown in FIG. 14, the second display module 1302 includes:

a state setting unit 1329, configured to set the second item picture to an opaque state; and a fourth dynamic display unit 1330, configured to display a dynamic effect that the second item picture moves from the first item picture to the card in which the detailed information is located while keeping a display state of the first item picture unchanged.

In some embodiments, as shown in FIG. 14, the query module 1306 includes:

a similarity obtaining unit 1361, configured to obtain a similarity between feature information of every two pictures in the plurality of pictures; and a query unit 1362, configured to query the item information database according to the feature information of the plurality of pictures when the obtained similarity is greater than a preset similarity, and obtain the item information matching the feature information of the plurality of pictures.

Figure 15:
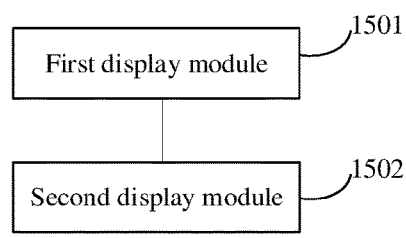
FIG. 15 is a schematic structural diagram of an item display apparatus according to one embodiment.

FIG. 15 is a schematic structural diagram of an item display apparatus according to one embodiment. Referring to FIG. 15, the apparatus includes:

a first display module 1501, configured to display media information through an information display interface, the media information including at least one picture, the at least one picture in the media information including a target item; and a second display module 1502, configured to display, in response to receiving a user browsing operation, a dynamic effect that a picture including the target item in the media information moves to a preset position in detailed information while displaying the detailed information of the target item.

Figure 16:
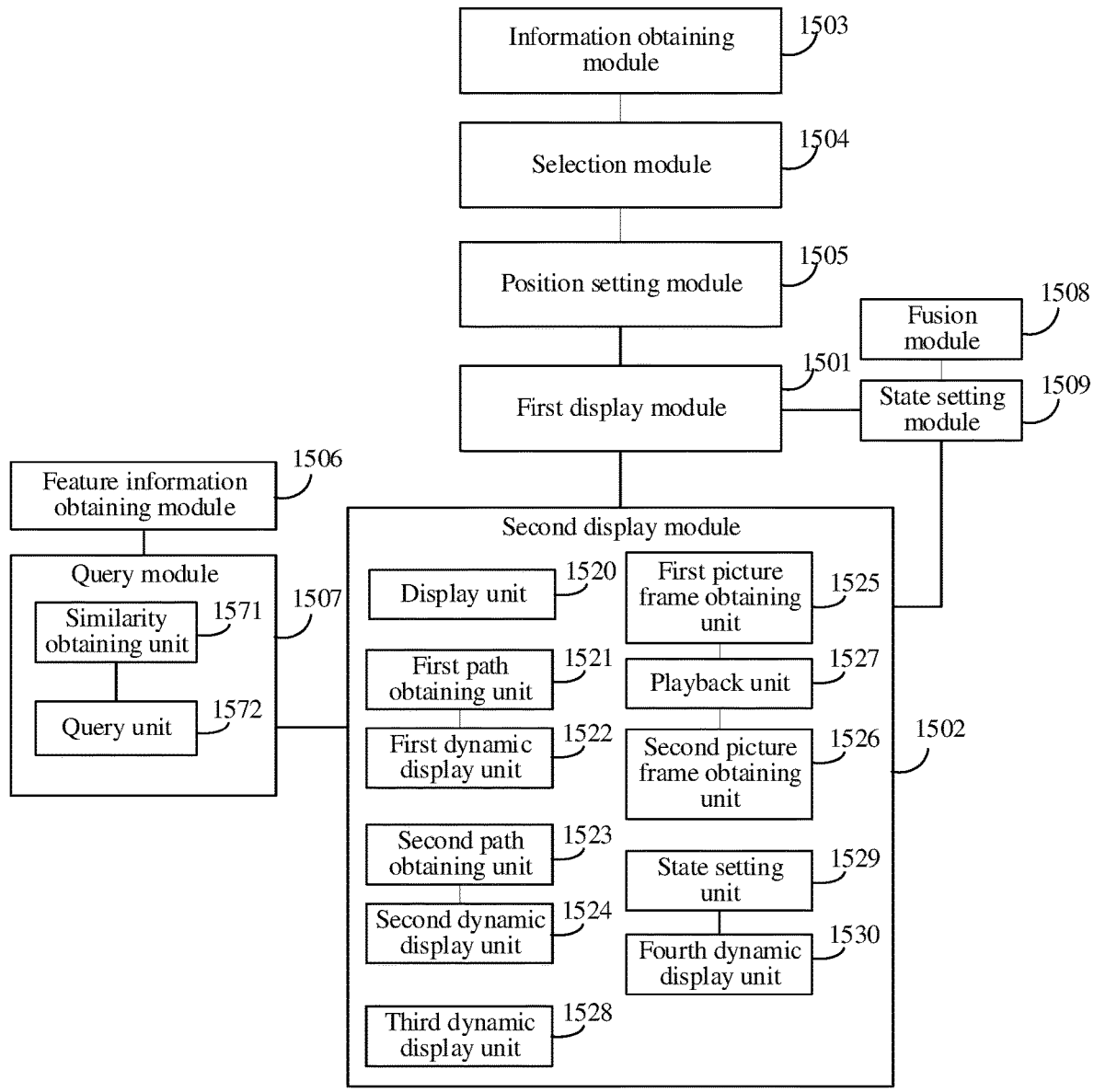
FIG. 16 is a schematic structural diagram of another item display apparatus according to one embodiment.

In some embodiments, as shown in FIG. 16, the second display module 1502 includes:
  a display unit 1520, configured to display a dynamic effect that the picture including the target item in the media information moves to the preset position in the detailed information while displaying the detailed information on one side of a specified direction of the media information through the information display interface, the specified direction including at least one of left, right, above, or below.

In some embodiments, as shown in FIG. 16, the display unit 1520 is further configured to:
  display, through the information display interface, a dynamic effect that the detailed information gradually moves in the specified direction from the display position of the media information, and the detailed information is gradually displayed during movement.

In some embodiments, as shown in FIG. 16, the second display module 1502 includes:
  a first path obtaining unit 1521, configured to obtain a movement path of the target item, the movement path being from an original position of the picture including the target item to the preset position in the detailed information; and
  a first dynamic display unit 1522, configured to display a dynamic effect that the picture including the target item moves according to the movement path while displaying the detailed information.

In some embodiments, as shown in FIG. 16, the second display module 1502 includes:
  a second path obtaining unit 1523, configured to obtain a movement path and a rotation angle of the target item, the movement path being from an original position of the picture including the target item to the preset position in the detailed information, the rotation angle being determined by a first angle of the target item at the original position and a second angle at the preset position; and
  a second dynamic display unit 1524, configured to display a dynamic effect that the picture including the target item moves according to the movement path and rotates according to the rotation angle while displaying the detailed information.

In some embodiments, as shown in FIG. 16, the second display module 1502 includes:
  a first picture frame obtaining unit 1525, configured to obtain a first picture frame, the first picture frame including the target item, the picture including the target item being located at an original position in the media information;
  a second picture frame obtaining unit 1526, configured to obtain a second picture frame, the second picture frame including the target item and the completely displayed detailed information, the picture including the target item being located at the preset position in the detailed information; and
  a playback unit 1527, configured to construct a tween animation by using the first picture frame as a start frame and the second picture frame as an end frame, and play the tween animation.

In some embodiments, as shown in FIG. 16, the media information is located in a first interface picture layer of the information display interface, and the second display module 1502 includes:
  a third dynamic display unit 1528, configured to display, in a second interface picture layer of the information display interface, a dynamic effect that the picture including the target item moves from the media information to the preset position while displaying the detailed information in the first interface picture layer.

In some embodiments, as shown in FIG. 16, the apparatus further includes:
  an information obtaining module 1503, configured to obtain media information, the media information including a plurality of pictures;
  a selection module 1504, configured to select a first item picture including the target item from the plurality of pictures;
  a position setting module 1505, configured to set a display position of the first item picture in the media information as a target display position, the target display position matching the preset position in the detailed information; and
  the first display module 1501, further configured to display the first item picture at the target display position of the media information through the information display interface.

In some embodiments, as shown in FIG. 16, the media information includes a plurality of pictures, and the apparatus further includes:
  a feature information obtaining module 1506, configured to obtain feature information of the plurality of pictures; and
  a query module 1507, configured to query an item information database according to the feature information of the plurality of pictures, and obtain item information matching the feature information of the plurality of pictures, the item information at least including the detailed information.

In some embodiments, as shown in FIG. 16, a first item picture in the media information includes the target item, the item information further includes a second item picture, and the apparatus further includes:
  a fusion module 1508, configured to fuse the second item picture with the first item picture, so that the second item picture covers the target item in the first item picture; and
  a state setting module 1509, configured to set the second item picture to a transparent state.

In some embodiments, as shown in FIG. 16, the second display module 1502 includes:
  a state setting unit 1529, configured to set the second item picture to an opaque state; and
  a fourth dynamic display unit 1530, configured to display a dynamic effect that the second item picture moves from the first item picture to the preset position in the detailed information while keeping a display state of the first item picture unchanged.

In some embodiments, as shown in FIG. 16, the query module 1507 includes:
  a similarity obtaining unit 1571, configured to obtain a similarity between feature information of every two pictures in the plurality of pictures; and
  a query unit 1572, configured to query the item information database according to the feature information of the plurality of pictures when the obtained similarity is greater than a preset similarity, and obtain the item information matching the feature information of the plurality of pictures.

Figure 17:
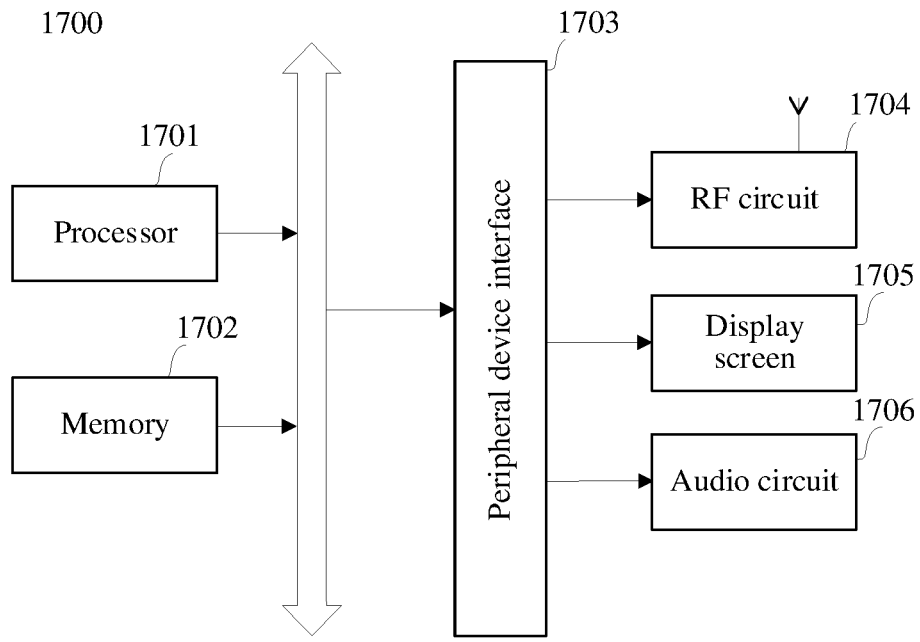
FIG. 17 is a schematic structural diagram of a terminal according to one embodiment.

FIG. 17 is a schematic structural diagram of a terminal 1700 according to an example embodiment of this application. The terminal 1700 may be configured to perform steps performed by the terminal in the foregoing item display method.

Generally, the terminal 1700 includes a processor 1701 and a memory 1702.

The processor 1701 may include one or more processing cores, for example, a 4-core processor or an 8-core processor. The processor 1701 may be implemented by using at least one hardware form of a digital signal processor (DSP), a field-programmable gate array (FPGA), and a programmable logic array (PLA). The processor 1701 may alternatively include a main processor and a coprocessor. The main processor is a processor configured to process data in an active state, and is also referred to as a central processing unit (CPU); and the coprocessor is a low-power processor configured to process data in a standby state. In some embodiments, the processor 1701 may be integrated with a graphics processing unit (GPU). The GPU is configured to render and draw content that needs to be displayed on a display screen. In some embodiments, the processor 1701 may further include an artificial intelligence (AI) processor. The AI processor is configured to process computing operations related to machine learning (ML).

The memory 1702 may include one or more computer-readable storage media. The computer-readable storage media may be non-transient. The memory 1702 may further include a high-speed random access memory (RAM) and a non-volatile memory, for example, one or more disk storage devices or flash memory devices. In some embodiments, a non-transient computer-readable storage medium in the memory 1702 is configured to store at least one piece of program code, the at least one piece of program code being configured to be executed by the processor 1701 to implement the item display method provided in the method embodiments of this application.

In some embodiments, the device 1700 may also include a peripheral device interface 1703 and at least one peripheral device. The processor 1701, the memory 1702, and the peripheral device interface 1703 may be connected through a bus or a signal cable. Each peripheral device may be connected to the peripheral device interface 1703 through a bus, a signal cable, or a circuit board. In one embodiment, the peripheral device includes: at least one of a radio frequency (RF) circuit 1704, a display screen 1705, a camera component 1706, an audio circuit 1707, a positioning component 1708, and a power supply 1709.

The peripheral device interface 1703 may be configured to connect at least one peripheral device related to input/output (I/O) to the processor 1701 and the memory 1702. In some embodiments, the processor 1701, the memory 1702, and the peripheral device interface 1703 are integrated into the same chip or the same circuit board. In some other embodiments, any one or two of the processor 1701, the memory 1702, and the peripheral device interface 1703 may be implemented on a separate chip or circuit board. This is not limited in this particular embodiment and may apply to other embodiments.

The RF circuit 1704 is configured to receive and transmit a RF signal, also referred to as an electromagnetic signal. The RF circuit 1704 communicates with a communication network and other communication devices through the electromagnetic signal. The RF circuit 1704 may convert an electric signal into an electromagnetic signal for transmission, or convert a received electromagnetic signal into an electric signal. In some embodiments, the RF circuit 1704 includes: an antenna system, an RF transceiver, one or more amplifiers, a tuner, an oscillator, a digital signal processor, a codec chip set, a subscriber identity module card, and the like. The RF circuit 1704 may communicate with other devices through at least one wireless communication protocol. The wireless communications protocol includes, but is not limited to, a metropolitan area network, different generations of mobile communication networks (2G, 3G, 4G, and 5G), a wireless local area network, and/or a wireless fidelity (Wi-Fi) network. In some embodiments, the RF circuit 1704 may further include a circuit related to near field communication (NFC), which is not limited in this particular embodiment and may apply to other embodiments.

The display screen 1705 is configured to display a user interface (UI). The UI may include a graph, a text, an icon, a video, and any combination thereof. When the display screen 1705 is a touchscreen, the display screen 1705 is further capable of acquiring a touch signal on or above a surface of the display screen 1705. The touch signal may be inputted into the processor 1701 as a control signal for processing. In this case, the display screen 1705 may be further configured to provide a virtual button and/or a virtual keyboard, also referred to as a soft button and/or a soft keyboard. In some embodiments, there may be one display screen 1705, disposed on a front panel of the terminal 1700. In some other embodiments, there may be at least two display screens 1705, disposed on different surfaces of the terminal 1700 respectively or in a folded design. In some embodiments, the display screen 1705 may be a flexible display screen disposed on a curved surface or a folded surface of the terminal 1700. Even, the display screen 1705 may be further set in a non-rectangular irregular pattern, that is, a special-shaped screen. The display screen 1705 may be manufactured by using a material such as a liquid crystal display (LCD), an organic light-emitting diode (OLED), or the like.

The camera component 1706 is configured to acquire images or videos. In some embodiments, the camera component 1706 includes a front-facing camera and a rear-facing camera. Generally, the front-facing camera is disposed on the front panel of the terminal 1700, and the rear-facing camera is disposed on a back face of the terminal 1700. In some embodiments, there are at least two rear-facing cameras, which are respectively any one of a main camera, a depth-of-field camera, a wide-angle camera, and a telephoto camera, to achieve background blurring function through fusion of the main camera and the depth-of-field camera, panoramic photographing and virtual reality (VR) photographing function through fusion of the main camera and the wide-angle camera, or other fusion photographing functions. In some embodiments, the camera component 1706 may further include a flash. The flash may be a monochrome temperature flash, or may be a double color temperature flash. The double color temperature flash refers to a combination of a warm flash and a cold flash, and may be used for light compensation at different color temperatures.

The audio circuit 1707 may include a microphone and a speaker. The microphone is configured to acquire sound waves of a user and an environment, and convert the sound waves into electrical signals and input the electrical signals into the processor 1701 for processing, or input the electrical signals into the RF circuit 1704 to implement voice communication. For stereo acquisition or noise reduction, there may be a plurality of microphones, disposed at different portions of the terminal 1700 respectively. The microphone may be further an array microphone or an omnidirectional collection microphone. The speaker is configured to convert electric signals from the processor 1701 or the RF circuit 1704 into sound waves. The speaker may be a conventional thin-film speaker, or may be a piezoelectric ceramic speaker. When the speaker is the piezoelectric ceramic speaker, electric signals not only can be converted into sound waves that can be heard by human, but also can be converted into sound waves that cannot be heard by human for ranging and the like. In some embodiments, the audio circuit 1707 may also include an earphone jack.

The positioning component 1708 is configured to position a current geographic location of the terminal 1700, to implement a navigation or a location based service (LBS). The positioning component 1708 may be a positioning component based on the Global Positioning System (GPS) of the United States, the BeiDou System of China, the GLONASS System of Russia, or the GALILEO System of the European Union.

The power source 1709 is configured to supply power for components in the terminal 1700. The power supply 1709 may be an alternating-current power supply, a direct-current power supply, a disposable battery, or a rechargeable battery. When the power supply 1709 includes the rechargeable battery, the rechargeable battery may be a wired rechargeable battery or a wireless rechargeable battery. The rechargeable battery may be further configured to support a fast charge technology.

A person skilled in the art may understand that the structure shown in FIG. 17 is one example embodiment and does not constitute a limitation on the terminal 1700, and the terminal may include more components or fewer components than those shown in the figure, or some components may be combined, or a different component deployment may be used in other embodiments.

Figure 18:
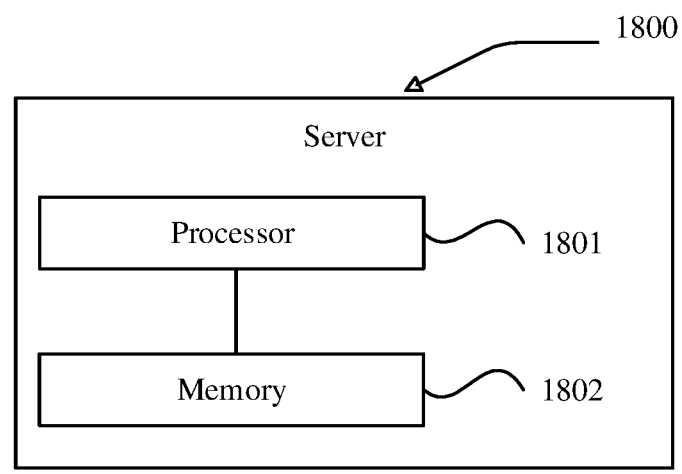
FIG. 18 is a schematic structural diagram of a server according to one embodiment.

FIG. 18 is a schematic structural diagram of a server according to one embodiment. The server 1800 may vary greatly due to different configurations or performance, and may include one or more CPUs 1801 and one or more memories 1802. The memory 1802 stores at least one piece of program code, the at least one piece of program code being loaded and executed by the processor 1801 to implement the methods provided in the foregoing method embodiments. Certainly, the server may further include components such as a wired or wireless network interface, a keyboard, and an I/O interface, to facilitate inputting/outputting. The server may further include other components configured to implement functions of a device, as described with respect to other embodiments.

The server 1800 may be configured to perform steps performed by the server in the foregoing item display method.

Some embodiments further provide for a computer device, including a processor and a memory, the memory storing at least one piece of program code, the at least one piece of program code being loaded and executed by the processor to implement operations performed in the item display method in the foregoing embodiments.

Some embodiments further provide a computer-readable storage medium, storing at least one piece of program code, the at least one piece of program code being loaded and executed by a processor to implement operations performed in the item display method in the foregoing embodiments.

Some embodiments further provide a computer program, including at least one piece of program code, the at least one piece of program code being loaded and executed by the processor to implement operations performed in the item display method in the foregoing embodiments.

A person of ordinary skill in the art may understand that all or some of the steps of the foregoing embodiments may be implemented by hardware, or may be implemented a program instructing related hardware. The program may be stored in a computer-readable storage medium. The storage medium may be a read-only memory (ROM), a magnetic disk, or an optical disc, or the like. The foregoing descriptions are merely optional embodiments of the embodiments of this application, but are not intended to limit the embodiments of this application. Any modification, equivalent replacement, or improvement made within the spirit and principle of the embodiments of this application falls within the protection scope of this application.

What is claimed is:

1. An item display method comprising:
   receiving a commodity presentation picture including a target item;
   dividing a commodity picture and a background picture from the commodity presentation picture;
   determining a first angle of the target item in the commodity picture;
   displaying media information through an information display interface, the media information comprising at least one picture, the at least one picture comprising the target item;
   in response to displaying at least one picture comprising a target item, displaying detailed information of the target item, comprising the background picture, through the information display interface when a display position of the media information satisfies a preset condition; and
   displaying a dynamic effect that includes the target item moving from the media information to a preset position in the detailed information while maintaining the display of the detailed information;
   wherein displaying a dynamic effect comprises:
   determining a rotation angle between the first angle and a second angle of the target item in the media information; and
   displaying a rotation effect, rotating a view of the target item from the second angle to the first angle.

2. The method according to claim 1, wherein the preset condition further comprises a location in a preset focus area of the information display interface.

3. The method according to claim 1, wherein the displaying detailed information further comprises: displaying the detailed information on one side of a specified direction of the media information through the information display interface, wherein the specified direction comprises at least one of left, right, above, or below.

4. The method according to claim 3, wherein the displaying the detailed information on one side of a specified direction of the media information further comprises: displaying, through the information display interface, a dynamic effect that the detailed information gradually moves in the specified direction from the display position of the media information, wherein the detailed information is gradually displayed from a transparent state to an opaque state during the gradual movement.

5. The method according to claim 1, wherein the displaying a dynamic effect further comprises: obtaining a movement path of the target item that is from an original position of the target item to the preset position in the detailed information; and displaying the dynamic effect that the target item moves according to the movement path while maintaining the display of the detailed information.

6. The method according to claim 1, wherein the displaying a dynamic effect further comprises: obtaining a movement path and a rotation angle of the target item, the movement path being from an original position of the target item to the preset position in the detailed information, and the rotation angle being determined by a first angle of the target item at the original position and a second angle at the preset position; and displaying the dynamic effect that the target item moves according to the movement path and rotates according to the rotation angle while maintaining the display of the detailed information.

7. The method according to claim 1, wherein the displaying a dynamic effect further comprises: obtaining a first picture frame comprising the target item, the target item being located at an original position in the media information; obtaining a second picture frame comprising the target item and the completely displayed detailed information, wherein the target item is located at the preset position in the detailed information; constructing a tween animation by using the first picture frame as a start frame and the second picture frame as an end frame; and playing the tween animation.

8. The method according to claim 1, wherein the media information is located in a first interface picture layer of the information display interface, and the displaying a dynamic effect further comprises: displaying, in a second interface picture layer of the information display interface, the dynamic effect that the target item moves from the media information to the preset position while maintaining the display of the detailed information in the first interface picture layer.

9. The method according to claim 1, wherein before the displaying media information through an information display interface, the method further comprises: obtaining the media information comprising a plurality of pictures; selecting a first item picture comprising the target item from the plurality of pictures; and setting a display position of the first item picture in the media information as a target display position that matches the preset position in the detailed information, wherein the displaying media information through an information display interface further comprises: displaying the first item picture at the target display position of the media information through the information display interface.

10. The method according to claim 1, wherein the media information comprises a plurality of pictures, and the method further comprises: obtaining feature information of the plurality of pictures; querying an item information database according to the feature information of the plurality of pictures; and obtaining item information matching the feature information of the plurality of pictures, the item information comprising the detailed information.

11. The method according to claim 10, wherein a first item picture in the media information comprises the target item, the item information further comprises a second item picture, and the method further comprises: fusing the second item picture with the first item picture, so that the second item picture covers the target item in the first item picture; and setting the second item picture to a transparent state.

12. The method according to claim 11, wherein the displaying a dynamic effect further comprises: setting the second item picture to an opaque state when the detailed information starts to be displayed; and displaying the dynamic effect that the second item picture moves from the first item picture to the preset position while maintaining the display of the detailed information and keeping a display state of the first item picture unchanged.

13. The method according to claim 10, wherein the querying an item information database further comprises: obtaining a similarity between feature information of every two pictures in the plurality of pictures; and querying the item information database according to the feature information of the plurality of pictures when the obtained similarity is greater than a preset similarity, and obtaining the item information matching the feature information of the plurality of pictures.

14. An item display apparatus comprising:
a processor;
an information display interface in communication with the processor; and
a non-transitory computer readable medium, in communication with the processor, storing a plurality of instructions, the plurality of instructions, when executed by a processor, configure the processor to:
receive a commodity presentation picture including a target item;
divide a commodity picture and a background picture from the commodity presentation picture;
determining a first angle of the target item in the commodity picture;
display media information through an information display interface, the media information comprising at least one picture, the at least one picture in the media information comprising a target item;
in response to displaying at least one picture comprising a target item, display detailed information of the target item, comprising the background picture, through the information display interface when a display position of the media information meets a preset condition; and
display a dynamic effect that the target item moves from the media information to a preset position in the detailed information while maintaining the display of the detailed information;
wherein displaying a dynamic effect comprises:
determining a rotation angle between the first angle and a second angle of the target item in the media information; and
displaying a rotation effect, rotating a view of the target item from the second angle to the first angle.

15. The item display apparatus of claim 14, wherein the processor is further configured to display the media information and detailed information of the target item through the information display interface, wherein the media information and the detailed information being located on different cards.

16. The item display apparatus of claim 15, wherein the processor is further configured to display, through the information display interface when a display position of the media information meets the preset condition, the dynamic effect that the target item moves from the media information to a card in which the detailed information is located.

17. The item display apparatus of claim 14, wherein the processor is further configured to display the dynamic effect in response to receiving a user browsing operation.

18. A non-transitory computer-readable storage medium, storing a plurality of instructions, the plurality of instructions, when executed by a processor, cause the processor to:
receive a commodity presentation picture including a target item;
divide a commodity picture and a background picture from the commodity presentation picture;
determining a first angle of the target item in the commodity picture;
display media information through an information display interface, the media information comprising at least one picture, the at least one picture in the media information comprising a target item;
in response to displaying at least one picture comprising a target item, display detailed information of the target item, comprising the background picture, through the information display interface when a display position of the media information meets a preset condition; and display a dynamic effect that the target item moves from the media information to a preset position in the detailed information while displaying the detailed information;

wherein displaying a dynamic effect comprises:
    determining a rotation angle between the first angle and a second angle of the target item in the media information; and
    displaying a rotation effect, rotating the view of the target item from the second angle to the first angle.

19. The non-transitory computer readable storage medium of claim 18, wherein before the displaying media information through an information display interface, the processor is further configured to:
    obtain the media information comprising a plurality of pictures;
    select a first item picture comprising the target item from the plurality of pictures; and
    set a display position of the first item picture in the media information as a target display position that matches the preset position in the detailed information, wherein the displaying media information through an information display interface further comprises: displaying the first item picture at the target display position of the media information through the information display interface.

20. The non-transitory computer readable storage medium of claim 18, wherein the media information comprises a plurality of pictures, and the processor is further configured to:
    obtain feature information of the plurality of pictures;
    query an item information database according to the feature information of the plurality of pictures; and
    obtain item information matching the feature information of the plurality of pictures, the item information comprising the detailed information; wherein a first item picture in the media information comprises the target item, the item information further comprises a second item picture, and the method further comprises: fusing the second item picture with the first item picture, so that the second item picture covers the target item in the first item picture; and setting the second item picture to a transparent state.

\* \* \* \* \*

UNITED STATES PATENT AND TRADEMARK OFFICE
CERTIFICATE OF CORRECTION

PATENT NO. : 11,954,710 B2
APPLICATION NO. : 17/682930
DATED : April 9, 2024
INVENTOR(S) : Rui Han et al.

It is certified that error appears in the above-identified patent and that said Letters Patent is hereby corrected as shown below:

In the Claims

Column 39, Claim 7, Line 11, delete "completely"

Signed and Sealed this
Twenty-first Day of May, 2024

*Katherine Kelly Vidal*

Katherine Kelly Vidal
*Director of the United States Patent and Trademark Office*